(12) United States Patent
Hong et al.

(10) Patent No.: US 11,985,653 B2
(45) Date of Patent: May 14, 2024

(54) APPARATUS AND METHOD FOR CONTROLLING INTERFERENCE BETWEEN BASE STATIONS IN WIRELESS COMMUNICATIONS SYSTEM

(71) Applicant: Samsung Electronics Co., Ltd., Suwon-si (KR)

(72) Inventors: Sungnam Hong, Suwon-si (KR); Byunggook Kim, Suwon-si (KR); Okyoung Choi, Suwon-si (KR); Hojoong Kwon, Suwon-si (KR); Myungkwang Byun, Suwon-si (KR); Jiyun Seol, Suwon-si (KR); Kiseob Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 17/609,228

(22) PCT Filed: May 7, 2020

(86) PCT No.: PCT/KR2020/006029
§ 371 (c)(1),
(2) Date: Nov. 5, 2021

(87) PCT Pub. No.: WO2020/226436
PCT Pub. Date: Nov. 12, 2020

(65) Prior Publication Data
US 2022/0225358 A1 Jul. 14, 2022

(30) Foreign Application Priority Data
May 7, 2019 (KR) .................. 10-2019-0053335
Jul. 22, 2019 (KR) .................. 10-2019-0088461

(51) Int. Cl.
*H04W 72/1263* (2023.01)
*H04W 72/0446* (2023.01)
(Continued)

(52) U.S. Cl.
CPC ... *H04W 72/1263* (2013.01); *H04W 72/0446* (2013.01); *H04W 72/0453* (2013.01); *H04W 72/542* (2023.01)

(58) Field of Classification Search
None
See application file for complete search history.

(56) References Cited

U.S. PATENT DOCUMENTS 6,304,760 B1 10/2001 Thomson et al.
9,794,813 B2 10/2017 Kim et al.
(Continued)

FOREIGN PATENT DOCUMENTS

EP 2678947 1/2014
KR 10-2012-0087167 A 8/2012
(Continued)

OTHER PUBLICATIONS

CATT et al.; Considerations on Enhanced SRS Transmission Schemes; 3GPP TSG RAN WG1 meeting #59bis; R1-100023; Jan. 18-22, 2010; Valencia, Spain.
(Continued)

*Primary Examiner* — Mohammad S Adhami
(74) *Attorney, Agent, or Firm* — Jefferson IP Law, LLP

(57) ABSTRACT

The present disclosure relates to a 5th (5G) generation or pre-5G communication system for supporting a higher data transmission rate beyond a 4th (4G) generation communication system such as long term evolution (LTE). An operating method of a base station in a wireless communication system may include identifying a resource for transmitting at least one sequence for interference measurement of another
(Continued)

base station, based on information received from a management device, and transmitting the at least one sequence through the resource, the information received from the management device may include information of the at least one sequence and the resource, and the information of the at least one sequence and the resource may be generated based on a grouping result of base stations based on an operating frequency.

18 Claims, 43 Drawing Sheets

(51) Int. Cl.
*H04W 72/0453* (2023.01)
*H04W 72/542* (2023.01)

(56) References Cited

U.S. PATENT DOCUMENTS

| | | | |
|---|---|---|---|
| 9,912,457 | B2 | 3/2018 | Jeong et al. |
| 10,034,181 | B1 | 7/2018 | Somashkar et al. |
| 10,117,248 | B1 | 10/2018 | Wurtenberger et al. |
| 11,864,217 | B2 * | 1/2024 | Kim .................... H04W 72/541 |
| 2011/0110251 | A1 | 5/2011 | Krishnamurthy et al. |
| 2013/0308485 | A1 | 11/2013 | Krishnamurthy et al. |
| 2013/0322289 | A1 | 12/2013 | Zhu et al. |
| 2014/0355469 | A1 | 12/2014 | Kang et al. |
| 2015/0223086 | A1 | 8/2015 | Kim et al. |
| 2016/0294523 | A1 | 10/2016 | Jeong et al. |
| 2017/0257177 | A1 | 9/2017 | Noh et al. |
| 2020/0169435 | A1 * | 5/2020 | Kang .................... H04W 24/10 |
| 2020/0389805 | A1 * | 12/2020 | Kim ...................... H04W 72/23 |
| 2021/0368510 | A1 * | 11/2021 | Xia ........................ H04W 72/27 |
| 2021/0410081 | A1 * | 12/2021 | Xu ......................... H04W 72/54 |

FOREIGN PATENT DOCUMENTS

| | | |
|---|---|---|
| KR | 10-2015-0057694 A | 5/2015 |
| KR | 10-2015-0068376 A | 6/2015 |
| WO | 2012/113098 A1 | 8/2012 |
| WO | 2013/085331 A1 | 6/2013 |
| WO | 2018/128297 A1 | 7/2018 |

OTHER PUBLICATIONS

Extended European Search Report dated May 27, 2022; European Appln. No. 20801839.0-1213 / 3965351 PCT/KR2020006029.

Indian Search Report dated Sep. 1, 2023; Indian Appln. No. 202117054444.

Japanese Office Action with English translation dated Jan. 30, 2024; Japanese Appln. No. JP2021-566265.

* cited by examiner

APPARATUS AND METHOD FOR CONTROLLING INTERFERENCE BETWEEN BASE STATIONS IN WIRELESS COMMUNICATIONS SYSTEM

TECHNICAL FIELD

The present disclosure generally relates to a wireless communication system, and more particularly, to an apparatus and a method for controlling interference between base stations in the wireless communication system.

BACKGROUND ART

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

In various wireless communication systems including the 5G system, interference between devices (e.g., base stations, terminals) which perform the wireless communication may occur at any time. A type of the interference may be variously defined according to a relationship of the devices in an indirect relationship. Since the interference causes communication quality deterioration, it is desirable to properly control the interference.

DISCLOSURE OF INVENTION

Technical Problem

Based on the discussions described above, the present disclosure provides an apparatus and a method for identifying an aggressor in a wireless communication system.

Also, the present disclosure provides an apparatus and a method for avoiding interference by an aggressor identified in a wireless communication system.

Also, the present disclosure provides an apparatus and a method for scheduling signal transmission for identifying an aggressor in a wireless communication system.

Solution to Problem

According to an embodiment of the present disclosure, an operating method of a base station in a wireless communication system may include identifying a resource for transmitting at least one sequence for interference measurement of another base station, based on information received from a management device, and transmitting the at least one sequence through the resource, the information received from the management device may include information of the at least one sequence and the resource, and the information of the at least one sequence and the resource may be generated based on a grouping result of base stations based on an operating frequency.

According to an embodiment of the present disclosure, an operating method of a base station in a wireless communication system may include identifying a resource to monitor at least one sequence transmitted by another base station, based on information received from a management device, detecting the at least one sequence from the resource, and transmitting detection result information of the at least one sequence to the management device, the information received from the management device may include information of the at least one sequence and the resource, and the information of the at least one sequence and the resource may be generated based on a grouping result of base stations based on an operating frequency.

According to an embodiment of the present disclosure, a base station in a wireless communication system may include a transceiver, and at least one processor connected with the transceiver, the at least one processor may, based on information received from a management device, identify a resource for transmitting at least one sequence for interference measurement of another base station, and transmit the at least one sequence through the resource, the information received from the management device may include information of the at least one sequence and the resource, and the information of the at least one sequence and the resource may be generated based on a grouping result of base stations based on an operating frequency.

According to an embodiment of the present disclosure, a base station in a wireless communication system may include a transceiver, and at least one processor connected to the transceiver, the at least one processor may, based on information received from a management device, identify a resource for monitoring at least one sequence transmitted by another base station, detect the at least one sequence in the resource, and transmit detection result information of the at least one sequence, the information received from the management device may include information of the at least one sequence and the resource, and the information of the at least one sequence and the resource may be generated based on a grouping result of base stations based on an operating frequency.

Advantageous Effects of Invention

An apparatus and a method according to various embodiments of the present disclosure, may effectively control interference between base stations, by scheduling signal transmission for measuring interference between base stations, and identifying an interference relationship based on a measurement result.

Effects obtainable from the present disclosure are not limited to the above-mentioned effects, and other effects which are not mentioned may be clearly understood by those skilled in the technical field of the present disclosure from the following descriptions.

BEST MODE FOR CARRYING OUT THE INVENTION

Figure 1:
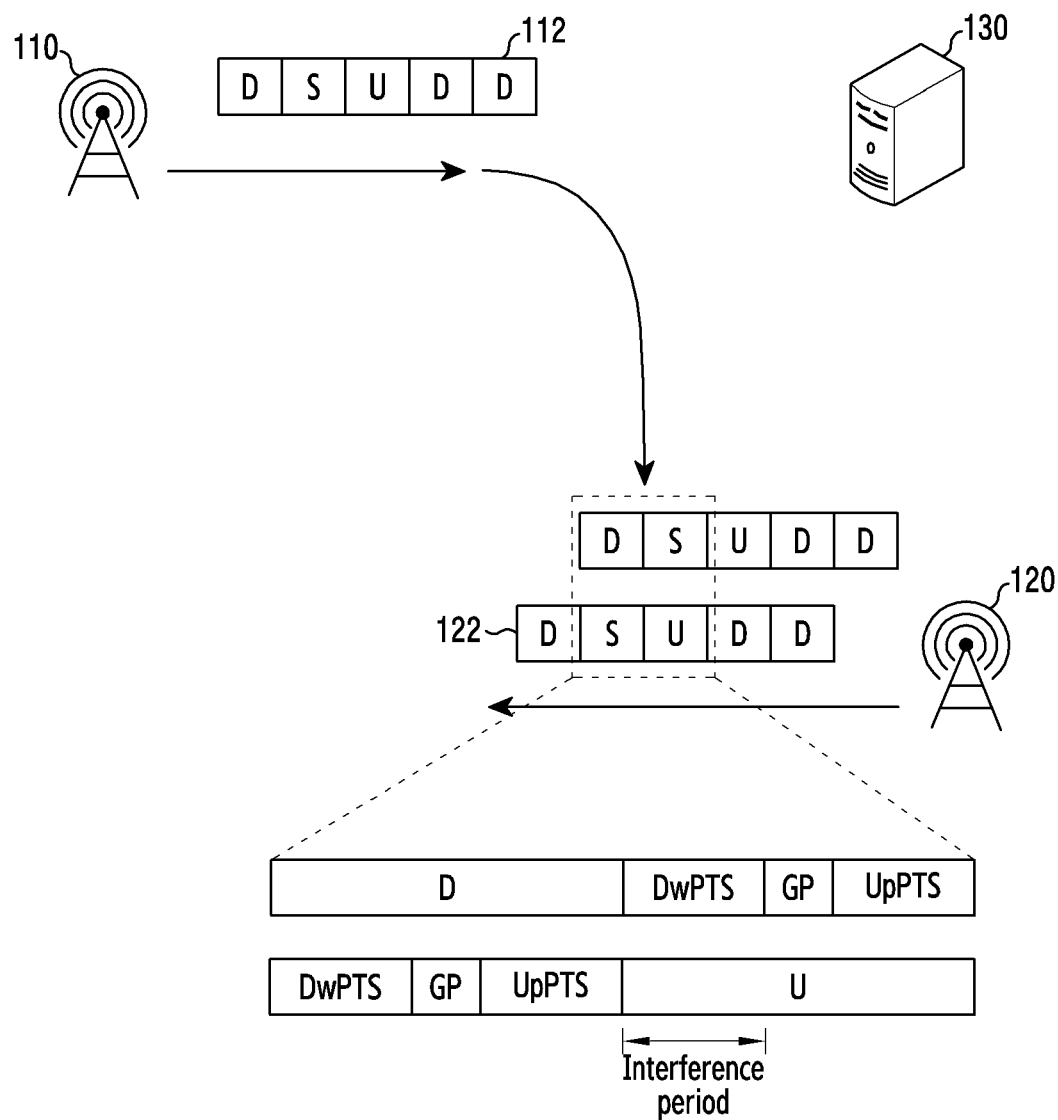
FIG. 1 illustrates a wireless communication system according to an embodiment of the present disclosure.

Terms used in the present disclosure are used for describing particular embodiments, and may not intend to limit the scope of other embodiments. A singular expression may include a plural expression, unless they are definitely different in a context. All terms used herein, including technical and scientific terms, may have the same meaning as those commonly understood by a person skilled in the art of the present disclosure. Terms defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Various embodiments of the present disclosure to be described below describe a hardware approach by way of example. However, since the various embodiments of the present disclosure include a technology using both hardware and software, an embodiment of the present disclosure do not exclude a software-based approach.

Hereinafter, the present disclosure relates to an apparatus and a method for controlling interference between base stations in a wireless communication system. Specifically, the present disclosure describes a technique for scheduling signal transmission for measuring the interference between the base stations in the wireless communication system, transmitting and measuring the signal based on a scheduling result, and identifying an interference relationship based on the measured result.

Terms indicating signals, terms indicating channels, terms indicating control information, terms indicating network entities, and terms indicating components of a device, which are used in the following descriptions, are exemplified for the sake of explanations. Accordingly, the present disclosure is not limited to the terms to be described, and may use other terms having technically identical or similar meaning.

Also, in the present disclosure, to determine whether a specific condition is satisfied or fulfilled, expressions such as greater than or less than are used by way of example and do not exclude expressions such as greater than or equal to or less than or equal to. A condition described with 'greater than or equal to' may be replaced by 'greater than', a condition described with 'less than or equal to' may be replaced by 'less than', and a condition described with 'greater than or equal to and less than' may be replaced by 'greater than and less than or equal to'.

In addition, the present disclosure describes an embodiment using terms used in some communication standard (e.g., 3rd generation partnership project (3GPP)), which are merely exemplary for explanations. An embodiment of the present disclosure may be easily modified and applied in other communication system.

FIG. 1 illustrates a wireless communication system according to an embodiment of the present disclosure. Referring to FIG. 1, the wireless communication system includes a base station 110, a base station 120, and a management device 130. FIG. 1 illustrates the base station 110 and the base station 120, as some of nodes which use a radio channel in the wireless communication system, but other base stations may be further included.

The base station 110 and the base station 120 are network infrastructure for providing radio accesses to terminals. The base station 110 and the base station 120 have coverage defined as a specific geographical area based on a signal transmission distance. The base station 110 and the base station 120 may be referred to as, besides the base station, an 'access point (AP)', an 'eNodeB (eNB)', a '5th generation node (5G node)', a 'next generation nodeB (gNB)', a 'wireless point', a 'transmission/reception point (TRP)', or other term having technically identical meaning. In some cases, the base station may be referred to as a 'cell'.

The management device 130 is an entity which controls a plurality of base stations including the base station 110 and the base station 120. For example, the management device 130 may control interference between the base stations. According to an embodiment, the management device 130 may control to identify an aggressor, and control an aggressor base station, a detector base station, an aggressor terminal, or detector terminals to avoid the interference. According to another embodiment, the role of the management device 130 may be carried out by one of the base stations (e.g., the base station 110 and the base station 120). According to yet another embodiment, the role of the management device 130 may be distributedly fulfilled by base stations (e.g., the base station 110 and the base station 120). In this case, information signaled between the management device 130 and the base stations 110 and 120 to be described may be signaled between the base stations 110 and 120.

The base station 110 may transmit or receive signals according to frames 112. The base station 120 may transmit or receive signals according to frames 122. In the frames 112 or the frames 122, 'D' denotes a downlink subframe, slot or symbol, 'S' denotes a special subframe, slot or symbol, and 'U' denotes an uplink subframe, slot or symbol.

In some cases, a signal transmitted in the downlink from the base station 110 may interfere in the uplink of the base station 120. For example, if an atmospheric duct phenomenon occurs in a time division (TD) system as shown in the example of FIG. 1, even though the base station 110 and the base station 120 are tens to hundreds of km apart, the signal transmitted from the base station 110 in the downlink may serve as strong interference to the uplink of the base station 120. For example, if a signal transmitted in a downlink pilot time slot (DwPTS) of the special subframe of the base station 110 experiences propagation delay and is received at the base station 120 in an uplink subframe period of the base station 120, the signal may serve as the interference in the uplink signal received at the base station 120. In this case, the base station 110 may be referred to as an aggressor, an aggressor base station, an interferencer or an interferencer base station, and the base station 120 may be referred to as a victim, a victim base station, a detector or a detector base station. Herein, the concepts of the aggressor/interferencer/victim/detector are relative, and any base station may be both the aggressor and the victim.

Due to the above-described interference, the victim (e.g., the base station 120) may not detect the uplink signal. To address the problem due to the interference, a measure for identifying the aggressor (e.g., the base station 110) to the interfered base station or cell (e.g., the base station 120), and reducing the interference or avoiding the interference is required. However, if the interference signal is received from a long distance of tens to hundreds of km, quite many aggressor candidates exist and it is not easy to specify a valid aggressor. Also, it is high likely that a plurality of aggressors exists. Hence, the present disclosure suggests an embodiment for identifying the aggressor, and reducing or avoiding the interference as follows.

In the interference relationship explained with reference to FIG. 1, it has been described that the interference is caused by receiving the signal transmitted in the DwPTS of the special subframe in the UpPTS of the special subframe or a subsequent uplink subframe. The concepts of the DwPTS and the UpPTS are used in a long term evolution (LTE) or LTE-advanced (LTE-A) system, but a similar interference relationship may exist in a 5th generation (5G) new radio (NR) system. In other words, in the 5G NR system, a downlink signal of one base station may act as interference to an uplink signal of another base station.

In this case, the DwPTS and the UpPTS may be understood as at least one downlink symbol and at least one uplink symbol in a dynamic time division duplex (TDD) slot, and the subsequent uplink subframe may be understood as a slot (e.g., an uplink only slot) including at least one uplink symbol at the front end. Hence, it is apparent that embodiments described below are also applicable to the 5G NR system. Accordingly, a ratio of the downlink period and the uplink period within the slot or subframe according to the dynamic TDD may be adjusted according to an interference measurement result (e.g., a sequence detection result). The ratio of the downlink period and the uplink period may be adjusted by changing a slot format. Specifically, according to the interference measurement result, the aggressor base station may increase the number of symbols used as a guard period. For example, the aggressor base station may change to a slot format including relatively more flexible symbols, and use the flexible symbols as the guard period. Alternatively, the aggressor base station may further use some of downlink symbols preceding the flexible symbol as the guard period.

Alternatively, the DwPTS and the UpPTS may be understood as at least one downlink slot or symbol and at least one uplink slot or symbol indicated by the uplink-downlink TDD configuration of the 5G NR. The TDD configuration of the NR may be configured more flexibly than the LTE. According to the TDD configuration of the NR, a DL-UL pattern indicating the downlink period and the uplink period is defined. The DL-UL pattern may be designated by periodicity, the number of slots and symbols of the downlink period, and the number of slots and symbols of the uplink period. In one period according to the periodicity, the front end includes the downlink period, the rear end includes the uplink period, and the rest is a flexible period, wherein at least part of the flexible period may be used as the guard period. Hence, a length of the downlink period or the uplink period of the DL-UL pattern may be adjusted according to the interference measurement result (e.g., the sequence detection result). By reducing the length of the downlink period or the uplink period, the length of the flexible period may increase. For example, to relatively increase the length of the flexible period, the aggressor base station may reduce the length of the downlink period or the uplink period, and increase the guard period.

Figure 2:
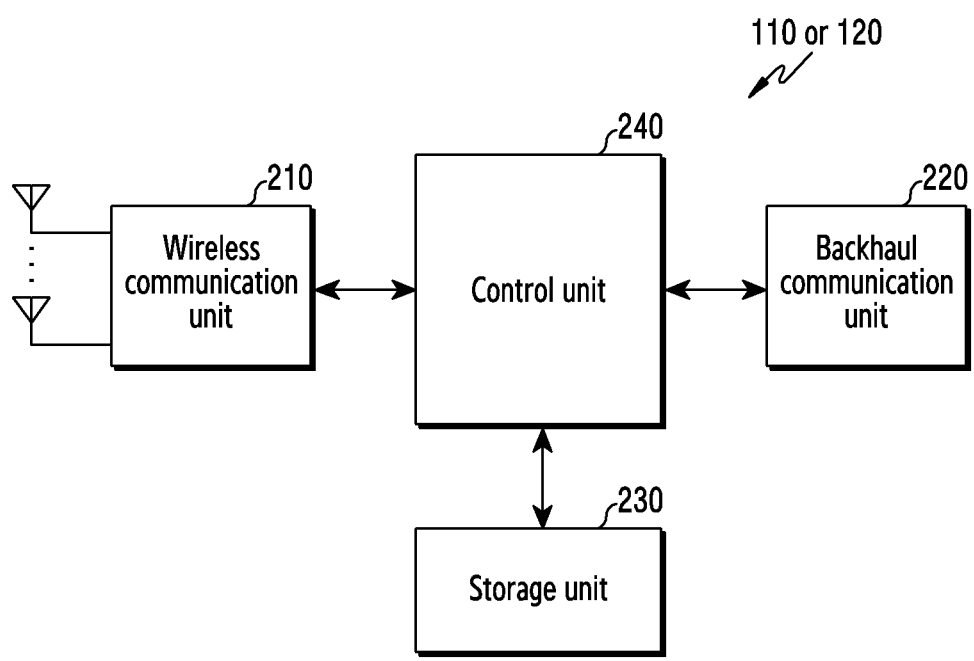
FIG. 2 illustrates a configuration of a base station in a wireless communication system according to an embodiment of the present disclosure.

FIG. 2 illustrates a configuration of a base station in a wireless communication system according to an embodiment of the present disclosure. The configuration illustrated in FIG. 2 may be understood as the configuration of the base station 110 or the base station 120. A term such as '~ unit' or '~ er' used hereafter indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may perform functions for transmitting and receiving signals over a radio channel. For example, the wireless communication unit 210 performs a conversion function between a baseband signal and a bit stream according to a physical layer standard of the system. For example, in data transmission, the wireless communication unit 210 generates complex symbols by encoding and modulating a transmit bit stream. Also, in data reception, the wireless communication unit 210 restores a receive bit stream by demodulating and decoding a baseband signal.

Also, the wireless communication unit 210 up-converts the baseband signal to a radio frequency (RF) band signal, transmits it via an antenna, and down-converts an RF band signal received via the antenna to a baseband signal. For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements.

In terms of the hardware, the wireless communication unit 210 may include a digital unit and an analog unit, and the analog unit may include a plurality of sub-units according to an operating power and an operating frequency. The digital unit may be implemented as at least one processor (e.g., a digital signal processor (DSP)).

The wireless communication unit 210 transmits and receives the signal as stated above. Hence, whole or part of the wireless communication unit 210 may be referred to as a 'transmitter', a 'receiver', or a 'transceiver'. Also, in the following explanations, the transmission and the reception over the radio channel is used as the meaning which embraces the above-stated processing of the wireless communication unit 210.

The backhaul communication unit 220 provides an interface for communicating with other nodes in the network. That is, the backhaul communication unit 220 converts a bit sting transmitted from the base station to other node, for example, to other access node, other base station, an upper node, or a core network, to a physical signal, and converts a physical signal received from the other node to a bit stream.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may perform functions of a protocol stack required by a communication standard. According to another embodiment, the protocol stack may be included in the wireless communication unit 210. For doing so, the control unit 240 may include at least one processor. According to an embodiment, the control unit 240 may control the base station (e.g., the base station 110 or the base station 12) to perform operations according to an embodiment to be explained.

Figure 3:
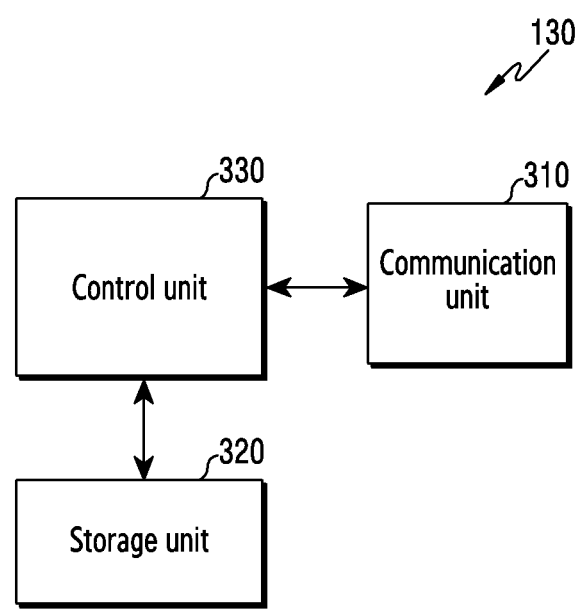
FIG. 3 illustrates a configuration of a management device in a wireless communication system according to an embodiment of the present disclosure.

FIG. 3 illustrates a configuration of a management device in a wireless communication system according to an embodiment of the present disclosure. FIG. 3 may be understood as the configuration of the management device 130. A term such as '~ unit' or '~ er' used hereafter indicates a unit for processing at least one function or operation, and may be implemented using hardware, software, or a combination of hardware and software.

Referring to FIG. 3, the management device includes a communication unit 310, a storage unit 320, and a control unit 330.

The communication unit 310 provides an interface for performing communication with other devices (e.g., a base station) in the network. That is, the communication unit 310 converts a bit stream transmitted from the management device to other device into a physical signal, and converts a physical signal received from other device into a bit stream. That is, the communication unit 310 may transmit and receive a signal. Accordingly, the communication unit 310 may be referred to as a modem, a transmitter, a receiver or a transceiver. At this time, the communication unit 310 may enable the management device to communicate with other devices or systems via a backhaul connection (e.g., wired backhaul or wireless backhaul) or via the network.

The storage unit 320 stores a basic program for operating the management device, an application program, and data such as setting information. The storage unit 320 may include a volatile memory, a nonvolatile memory, or a combination of a volatile memory and a nonvolatile memory. The storage unit 320 provides the stored data according to a request of the control unit 330.

The control unit 330 controls general operations of the management device. For example, the control unit 330 transmits and receives the signal through the communication unit 310. Also, the control unit 330 records and reads data in and from the storage unit 320. For doing so, the control unit 330 may include at least one processor. According to an embodiment, the control unit 330 may control the management device to perform operations according to an embodiment to be described.

Figure 4:
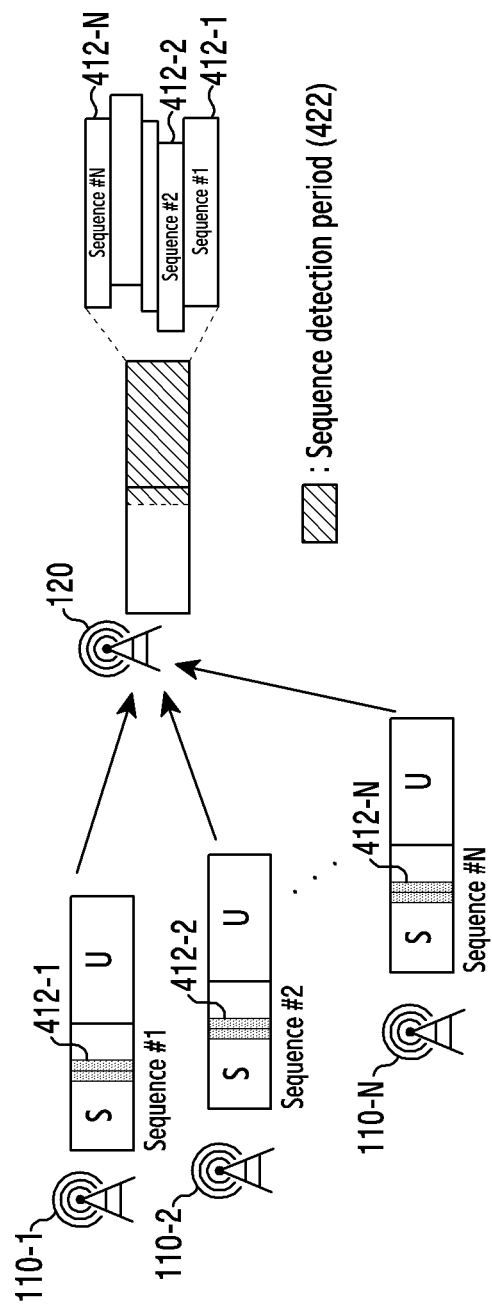
FIG. 4 illustrates a concept of interference measurement based on sequence transmission in a wireless communication system according to an embodiment of the present disclosure.

FIG. 4 illustrates a concept of interference measurement based on sequence transmission in a wireless communication system according to an embodiment of the present disclosure. Referring to FIG. 4, aggressor base stations 110-1 through 110-N transmit predefined sequences 412-1 through 412-N at at least one specific symbol position in a specific special subframe respectively. Hence, a detector base station 120 may receive the sequences 412-1 through 412-N transmitted by the aggressor base stations 110-1 through 110-N in the special subframe or a subsequent uplink subframe. The detector base station 120 may identify and distinguish the base stations 110-1 through 110-N transmitting the sequences, based on at least one of a reception time (e.g., a system frame number, a subframe number, a slot number, a time value, etc.) reception delay time of the sequences 412-1 through 412-N, and identification information (e.g., an identifier (ID), an index, etc.) of the received sequence. Based on the information obtained by receiving the sequences 412-1 through 412-N, an aggressor-detector relationship may be derived. For example, the base station transmitting the detected sequence becomes an aggressor candidate.

In FIG. 4, the sequence which is the signal for deriving the interference relationship may be different from a sequence defined in the standard (e.g., a synchronization signal, a random access preamble). The sequence is one signal sequence selected from a set of orthogonal or quasi-orthogonal signal sequences. The set of the signal sequences may be predefined. For example, as the set of the signal sequences, one of various existing orthogonal signal sequences (e.g., a zadoff-chu sequence, a golay sequence) or a modification thereof may be employed. The sequence may be referred to as an 'orthogonal signal', a 'quasi-orthogonal signal', an 'interference measurement signal', a 'midamble', or other term having the equivalent technical meaning.

Figure 5:
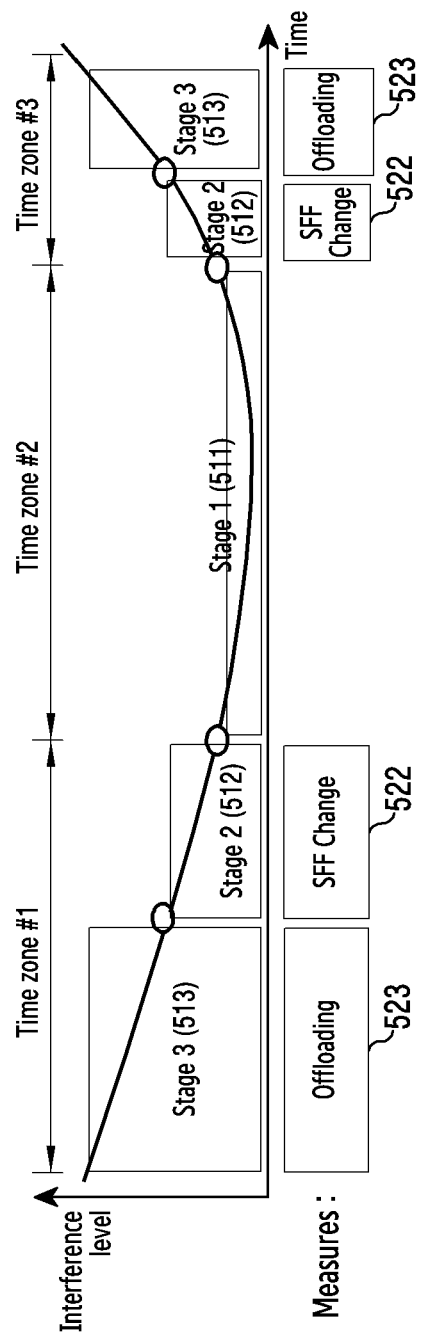
FIG. 5 illustrates an example of avoidance measures according to an interference level in a wireless communication system according to an embodiment of the present disclosure.

FIG. 5 illustrates an example of avoidance measures according to an interference level in a wireless communication system according to an embodiment of the present disclosure. FIG. 5 illustrates an interference level change according to three time zones and measures corresponding to the interference level.

Referring to FIG. 5, the interference level may be classified into three stages, for example, a stage1 511, a stage2 512, and a stage3 513. According to the time zone, the three stages 511, 512, and 513 may occur in a pattern as shown in FIG. 5. Specifically, the interference level may change from the stage3 513 to the stage2 512 during a time zone #1, maintained at the stage1 511 during a time zone #2, and changed from the stage2 512 to the stage3 513 during a time zone #3. For example, the time zone #1 may be morning, the time zone #2 may be day time, and the time zone #3 may be evening.

In the stage1 511, the interference level is relatively lowest, and no measures may be taken. In the stage2 512, moderate interference exists, and base stations determined as aggressors may take measures to reduce the interference. For example, in the stage2 512, the aggressor base station may change the configuration of the special subframe to use a longer guard period. Specifically, the aggressor base station may change from a configuration (e.g., a special subframe (SSF)-7) using the guard period including 2 symbols to a configuration (e.g., an SSF-5) using the guard period including 9 symbols. In the stage3 513, the interference level is relatively highest, and a base station determined as the victim may take measures to avoid the interference. For example, the victim base station may offload a terminal or a user equipment (UE) located at a cell boundary to other cell (e.g., a frequency division duplex (FDD) cell).

Figure 6:
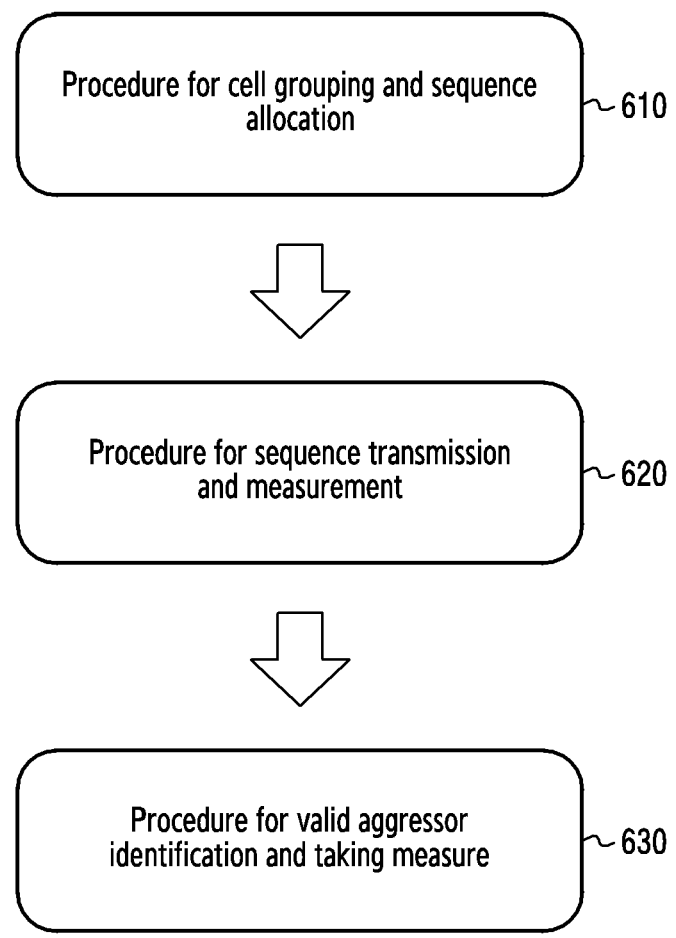
FIG. 6 illustrates procedures for measuring and controlling interference in a wireless communication system according to an embodiment of the present disclosure.

FIG. 6 illustrates procedures for measuring and controlling interference in a wireless communication system according to an embodiment of the present disclosure. Referring to FIG. 6, the procedures for the interference measurement and control include a first procedure 610 for cell grouping and sequence allocation, a second procedure 620 for sequence transmission and measurement, and a third procedure 630 for identifying a valid aggressor and taking measures. The first procedure 610 may be performed by a management device (e.g., the management device 130), the second procedure 620 may be performed by base stations (e.g., the base stations 110 and 120), and the third procedure 630 may be performed by the base stations and the management device. Hereinafter, an embodiment of each procedure is described.

Figure 7:
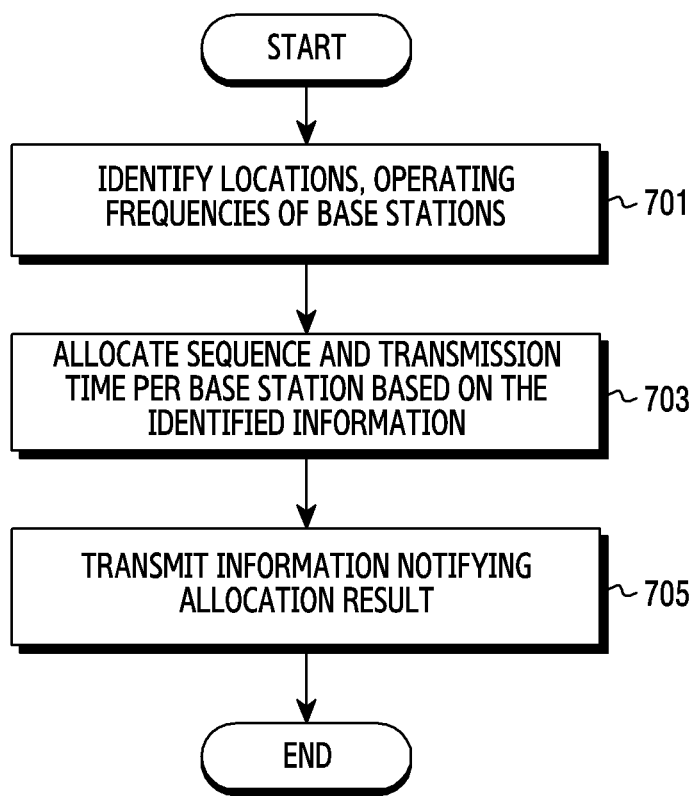
FIG. 7 illustrates a flowchart for operations of a management device in a wireless communication system according to an embodiment of the present disclosure.

FIG. 7 illustrates a flowchart for operations of a management device in a wireless communication system according to an embodiment of the present disclosure. FIG. 7 illustrates an operating method of the management device 130.

Referring to FIG. 7, in step 701, the management device identifies locations and operating frequencies of base stations (e.g., a base station 110, a base station 110-1, a base station 110-2, a base station 110-3, a base station 120). Herein, the location includes at least one of a region and coordinates, and the operating frequency includes at least one of a center frequency and a bandwidth. A distance between the base stations may be calculated from the locations of the base stations. Additionally, the management device may further identify at least one of a maximum arrival distance, and a transmission period of the sequence. Herein, the maximum arrival distance of the sequence may be replaced by a maximum distance allowing sequence measurement.

In step 703, the management device allocates a sequence for each base station based on the identified information, and allocates a transmission time of the sequence. In other words, the management device schedules the sequence transmission of each base station. Herein, the scheduling includes sequence ID allocation and resource allocation. In addition, allocating the resource includes at least one of distributing available sequence transmission opportunities, determining a transmission period, determining a transmission period, and selecting at least one symbol within the transmission opportunity. The transmission opportunity may be referred to as a 'time' or a 'timing'. The transmission period refers to a duration including a plurality of consecutive transmission opportunities. Accordingly, which base station transmits which sequence and at which time may be determined. For example, the management device may schedule the sequence transmission to allow base stations to transmit the sequence at least once within a given transmission period. According to an embodiment, the management device may group base stations into a plurality of groups, and allocate the transmission period for each group.

In step 705, the management device transmits information notifying the allocation result. The information notifying the allocation result may be delivered to at least one base station for transmitting the sequence as well as to at least one base station for monitoring the sequence. The information notifying the allocation result may include at least one of information indicating the sequence, information indicating the transmission opportunity (e.g., a system frame number, a subframe number, a slot number, a time value, etc.), information indicating the resource for mapping the sequence, and information indicating the group. According to an embodiment, the information included in the allocation result delivered to at least one base station for transmitting the sequence and the information included in the allocation result delivered to at least one base station for monitoring the sequence may be different from each other.

Some of the various information exemplified to be included in the scheduling result, described with reference to FIG. 7, may be predefined, or some may be determined by the base station which transmits the sequence. In this case, at least part of the remaining information may be delivered from the management device to at least one base station.

According to an embodiment, a correspondence relationship of the sequence and the group may be predefined. In this case, the group may be derived from the information indicating the sequence (e.g., the ID or the index of the sequence). Thus, the information indicating the group may be omitted.

According to another embodiment, a correspondence relationship of the group and the transmission opportunity may be predefined. In this case, the transmission opportunity may be derived from the information indicating the group. Hence, the information indicating the transmission opportunity may be omitted. On the contrary, the group may be derived from the information indicating the transmission opportunity, and the information indicating the group may be omitted.

According to yet another embodiment, a correspondence relationship of the sequence and the group and a correspondence relationship of the group and the transmission opportunity may be predefined. In this case, the group may be derived from the information indicating the sequence (e.g., the sequence ID or index), and the transmission opportunity may be derived from the information indicating the group. Hence, the information indicating the group and the information indicating the transmission opportunity may be omitted.

Similarly, if a correspondence relationship between any two information items is defined, another information item may be derived from any one information item. In this case, the management device may exclude one of the two information items, and transmit the other as the scheduling result. Thus, the information included in the scheduling result may be variously configured according to the presence or absence of the defined correspondence relationship.

As described with reference to FIG. 7, the management device may schedule the sequence transmission, and provide the scheduling result. Hereinafter, examples of the operations of the management device are described with reference to FIG. 8 through FIG. 14.

Base stations using different operating frequencies may be mixed, in the wireless communication system considered in the present disclosure. Herein, the different operating frequencies mean that at least one of the center frequencies or the bandwidths is different. Accordingly, in performing the scheduling transmission of the sequence, the management device may group the base stations into a plurality of groups based on the operating frequency. An example of the grouping result is shown in FIG. 8.

Figure 8:
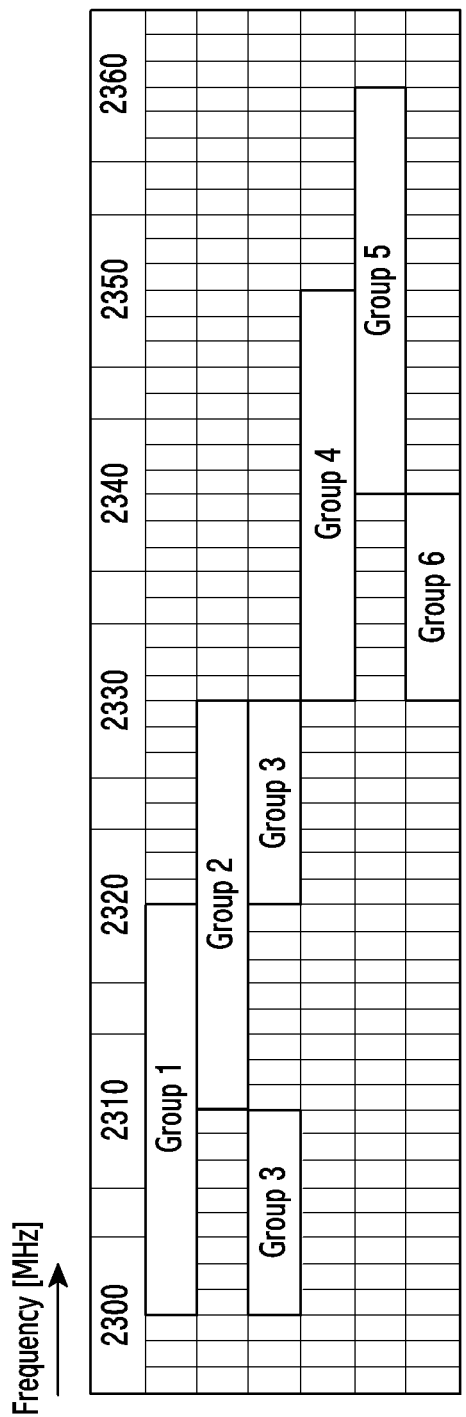
FIG. 8 illustrates an example of a grouping result of base stations according to an operating frequency in a wireless communication system according to an embodiment of the present disclosure.

FIG. 8 illustrates an example of a grouping result of base stations according to an operating frequency in a wireless communication system according to an embodiment of the present disclosure. Referring to FIG. 8, grouping may be performed based on the operating frequency. The management device may classify base stations not to overlap the operating frequencies on the frequency axis, and then group them specifically as necessary. For example, as shown in FIG. 8, the base stations may be classified into {group1, group2, group 3} and {group 4, group 5, group 6}, and then regrouped to {group1}, {group2}, {group 3}, {group 4}, {group 5}, and {group 6}. If the operating frequencies of the base stations transmitting the sequences do not overlap and thus no detector base station may simultaneously receive the sequences, the same sequence may be assigned to the base stations. Herein, 'simultaneous' may be understood as 'during the same transmission opportunity'.

Figure 9:
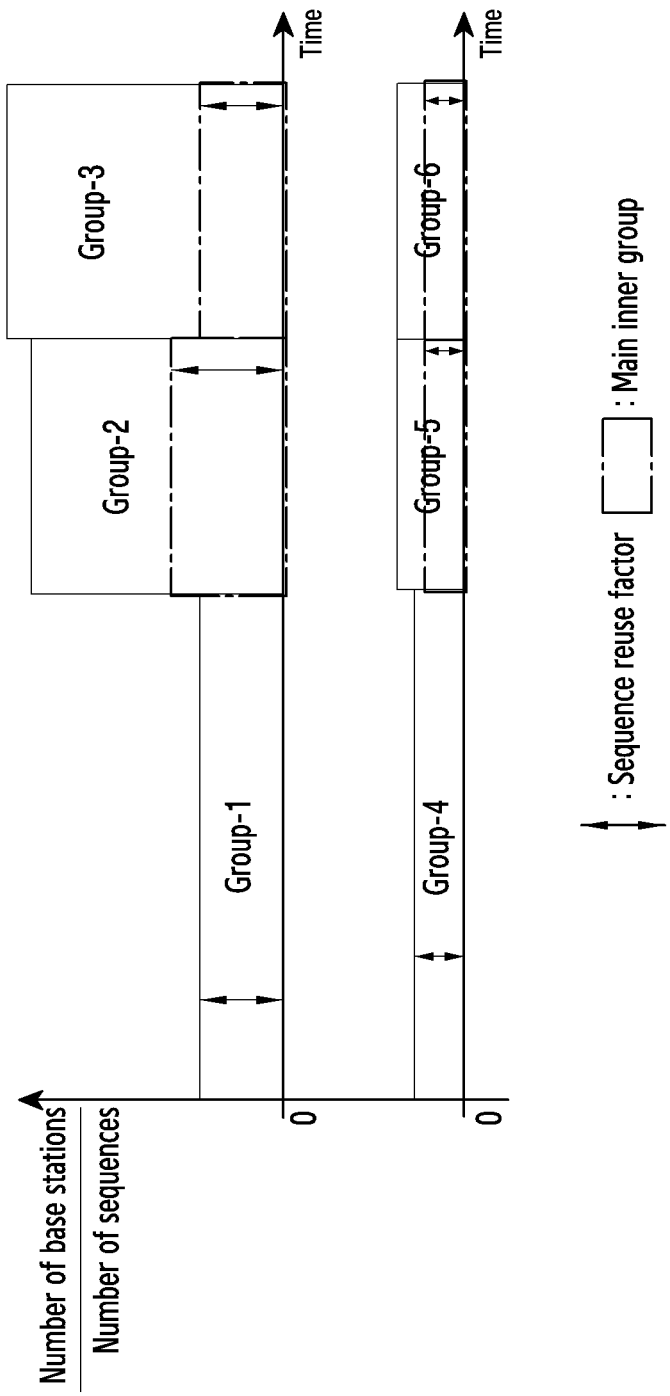
FIG. 9 illustrates an example of a sequence transmission timing per group in a wireless communication system according to an embodiment of the present disclosure.

The grouping result illustrated in FIG. 8 may be utilized as shown in FIG. 9. FIG. 9 illustrates an example of a sequence transmission timing for each group in a wireless communication system according to an embodiment of the present disclosure. In FIG. 9, the horizontal axis represents time, and the vertical axis represents 'the number of sequences/number of base stations', in other words, the number of base stations per sequence. Referring to FIG. 9, since {group1, group2, group 3} and {group 4, group 5, group 6} have exclusive operating frequencies in the frequency axis, they are controlled to transmit the sequence for the same time. Since {Group1}, {Group2}, and {Group 3} have operating frequencies which overlap at least in part on the frequency axis, they are controlled to transmit the sequence during different transmission periods, and {Group 4}, {Group 5}, and {group 6} which have the operating frequencies at least partially overlapping in the frequency axis, are controlled to transmit the sequence during different transmission periods.

It is difficult to simultaneously receive the signals transmitted from the base stations using different center frequencies, due to frequency axis grid differences. Hence, the management device may perform the grouping based on the center frequency or the bandwidth, and schedule only base stations belonging to a single group to transmit the sequence during one transmission period. In inter-group allocation, the management device may allocate a time resource to each group to minimize a maximum sequence reuse factor. In intra-group allocation, the management device may uniformly allocate a given time resource to each base station. In the group1 and the group4, the number of the base stations per sequence is the same as the sequence reuse factor. In the group2, the group3, the group5, and the group6, the number of the base stations per sequence is greater than the sequence reuse factor. For the group2, the group3, the group5, and the group6, the management device may allocate sequences or time slots first to some base stations belonging to the main inner group, and then reallocate the allocated sequences or time slots to the remaining base stations.

Figure 10:
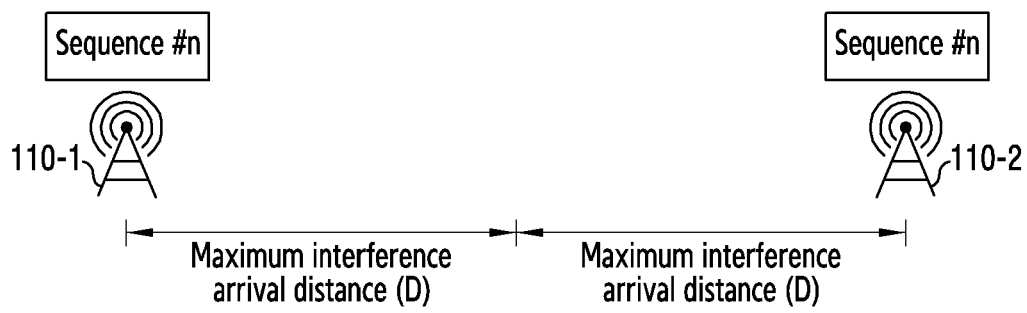
FIG. 10 illustrates an example of distance-based sequence allocation in a wireless communication system according to an embodiment of the present disclosure.

If allocating the sequences within one group, distances between base stations may be considered. For example, as shown in FIG. 10, a maximum interference arrival distance may be considered. FIG. 10 illustrates an example of a distance-based sequence allocation in a wireless communication system according to an embodiment of the present disclosure. As shown in FIG. 10, if the same sequence #n is allocated to two base stations 110-1 and 110-2 which are spaced by the maximum distance between an aggressor and a detector capable of receiving the sequence, that is, twice the maximum interference arrival distance D, no detector base station may receive both the sequence #n transmitted by the base station 110-1 and the sequence #n transmitted by the base station 110-2.

As shown in the example of FIG. 10, the management device may schedule base stations spaced apart over a specific distance to transmit the same sequence at the same timing. That is, if a distance range of the aggressor capable of receiving the sequence is defined, a sequence transmission time and a sequence ID allocation rule based on the distance range may be defined. For example, as many base stations as possible transmit the same sequence at the same time using the location information of each base station, and no detector base station may simultaneously receive the sequences of the same ID, that is, the same sequences. Thus, each detector base station may specify the base station transmitting the sequence based on the time of receiving the sequence, the ID of the received sequence, the location of the aggressor base station, and so on.

However, if the transmission period allocated to a given base station group is not long enough, two base stations spaced apart by a distance shorter than twice the maximum interference arrival distance D may simultaneously transmit the same sequence. In this case, according to another embodiment, the management device may perform the scheduling, to maximize the minimum distances of the base stations simultaneously transmitting the same sequence with respect to every sequence transmission time and every sequence. Thus, the number of cases in which the detector base station simultaneously receives the same sequence may be reduced. Even if the same sequences are received at the same time, since the distance between the base stations transmitting the sequences at the same time is maximized, the detector base station may distinguish the base stations using the signal direction and the location information of the base stations. Alternatively, even if the same sequences are simultaneously received, the detector base station may specify the base stations based on the signal direction, a delay time, and the like. In other words, the detector base station may estimate the propagation distance of the sequence based on the signal delay time, and specify the base station transmitting the sequence based on the estimated propagation distance and direction.

Figure 11:
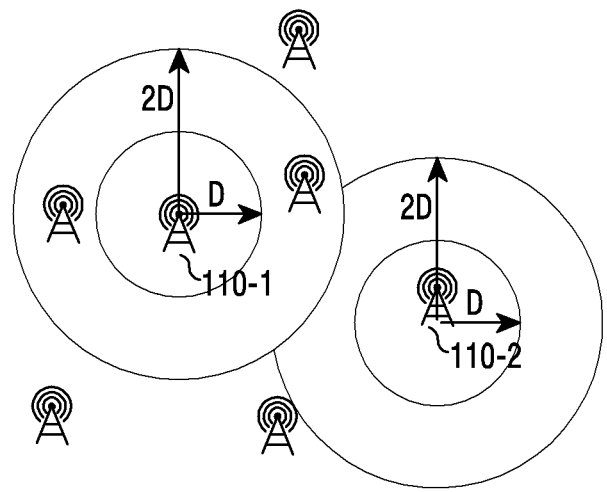
FIG. 11 illustrates an example of sequence allocation of a distance-based period first scheme in a wireless communication system according to an embodiment of the present disclosure.
Figure 12:
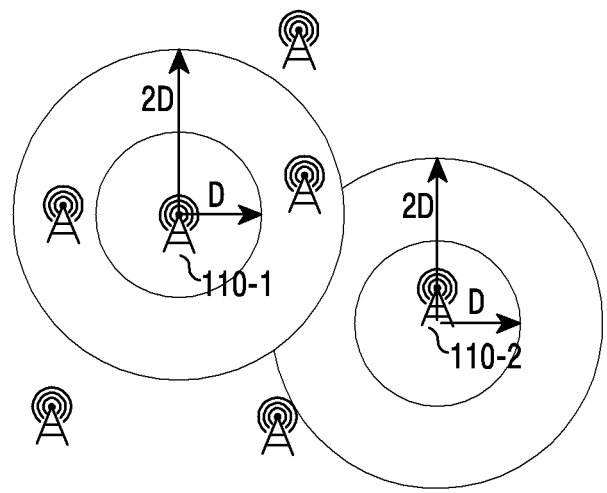
FIG. 12 illustrates an example of sequence allocation of a distance-based sequence first scheme in a wireless communication system according to an embodiment of the present disclosure.

If the interval between the base stations transmitting the same sequences at the same time may not be guaranteed over twice the maximum interference arrival distance D, the sequence allocation may be performed as shown in FIG. 11 or FIG. 12 below.

FIG. 11 illustrates an example of sequence allocation of a distance-based period first scheme in a wireless communication system according to an embodiment of the present disclosure. Referring to FIG. 11, the management device allocates sequences (e.g., a sequence #1 through a sequence #8) and transmission times to base stations within a given transmission period based on at least one of a bandwidth, a center frequency, region/location information, and a maximum interference arrival distance of the base stations. For example, the management device allocates one sequence to the base stations for each transmission time, and allocates a next sequence to at least some of the remaining base stations not scheduled for each transmission time.

After the allocation of all the sequences is completed, if an unscheduled base station remains, the management device repeats the allocation operation. In so doing, the same sequence and the same transmission timing may be allocated to two or more base stations. In this case, the management device schedules to make the interval between the base stations allocated the same transmission time and the same sequence at least twice the maximum interference arrival distance. If there is no base station having the interval over twice the maximum interference arrival distance, the management device may select a base station at random or having a maximum interval.

FIG. 12 illustrates an example of sequence allocation of a distance-based sequence first scheme in a wireless communication system according to an embodiment of the present disclosure. Referring to FIG. 12, the management device allocates sequences (e.g., a sequence #1 through a sequence #8) and transmission times to base stations based on at least one of a bandwidth, a center frequency, region/location information, and a maximum interference distance of the base stations. The length of the transmission period may be determined according to the allocation result. For example, the management device allocates sequences to the base stations with respect to one transmission time, and allocates sequences to at least some of base stations not scheduled for a next transmission time. If the sequences are assigned to all of target base stations, the transmission period may be determined. In this case, the same transmission time and the same sequence are not allocated to two or more base stations, unless a maximum value of the transmission period is reached. However, if the interval between the base stations is greater than twice the maximum interference arrival distance, the same transmission time and the same sequence may be allocated to the base stations having the interval over twice the maximum interference arrival distance.

As aforementioned with reference to FIG. 8 and FIG. 9, simultaneous transmissions of a plurality of groups may be or may not be allowed according to the operating frequency. Hence, the management device may group cells per bandwidth and center frequency by considering the environment where various bandwidths and center frequencies are mixed. After the grouping, the management device may schedule the sequence transmission for each group.

Figure 13A:
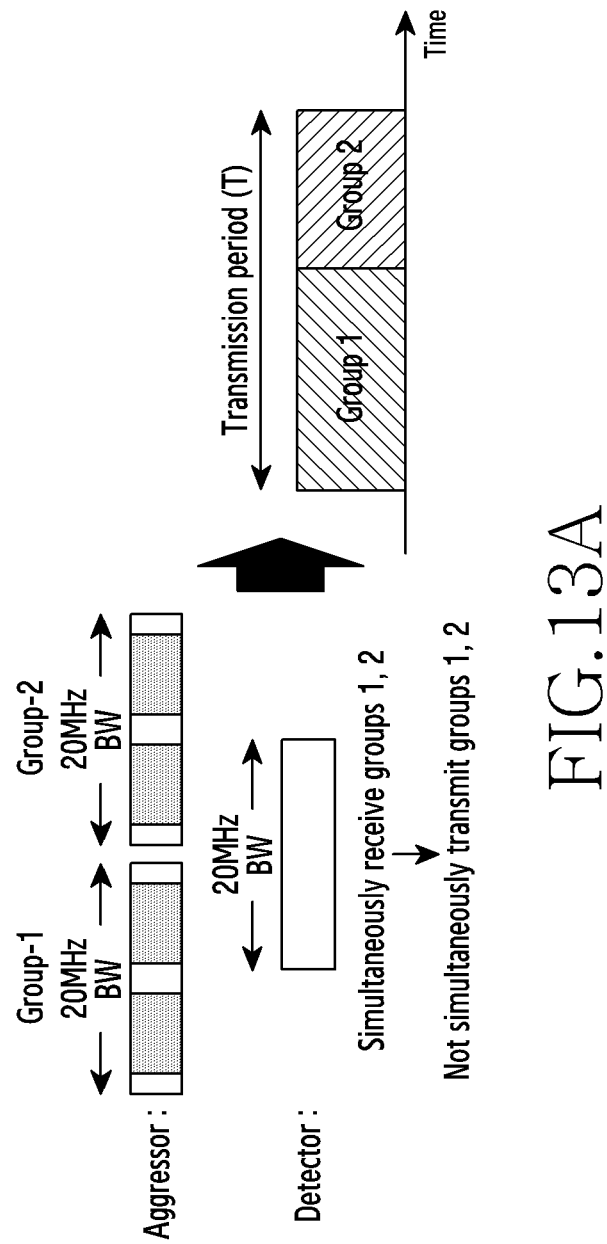
FIG. 13A and FIG. 13B illustrate an example of groups capable of and groups incapable of simultaneously transmitting a sequence in a wireless communication system according to an embodiment of the present disclosure.
Figure 13B:
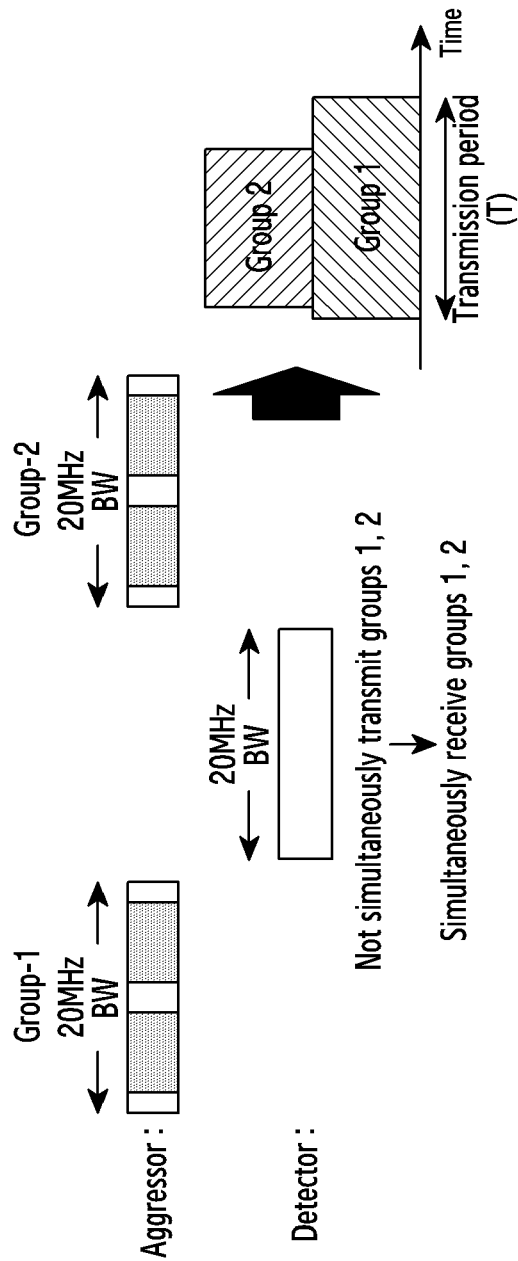

An example of not allowing the simultaneous transmissions of the plurality of groups is shown in FIG. 13A below, and an example of allowing the simultaneous transmission is shown in FIG. 13B below. FIG. 13A and FIG. 13B illustrate an example of groups enabling and groups disabling simultaneous sequence transmission in a wireless communication system according to an embodiment of the present disclosure.

Referring to FIG. 13A, the operating frequency of the group1 and the operating frequency of the group2 each overlap part of the operating frequency of the detector base station. In this case, since the detector base station may simultaneously receive the sequences transmitted from the group1 and the group2, the group1 and the group2 are not allowed to transmit the same sequence at the same time. Hence, different transmission periods are allocated to the group1 and the group2.

Referring to FIG. 13B, the operating frequency of the group1 and the operating frequency of the group2 each do not overlap the operating frequency of the detector base station. In this case, since the detector base station may not simultaneously receive the sequences transmitted from the group1 and the group2, the group1 and the group2 are allowed to transmit the same sequence at the same time. Thus, the same transmission period may be allocated to the group1 and the group2.

According to the examples of FIG. 13A and FIG. 13B, whether to allocate the same transmission period to the group1 and the group2 may differ according to the range of the operating frequency. However, even if the operating frequency is the same but it is guaranteed that the detector base station is affected only by the group 1, or only by the group2, the same transmission period may be allocated to the group1 and the group2.

As described above, the management device may group the base stations for transmitting the sequence according to the defined criterion, and set the transmission period for transmitting the sequence for each group. The criterion for grouping the base stations may include at least one of the center frequency, the bandwidth, the region, and the location of each base station. The management device may transmit to the base stations at least one of grouping result information of the base stations, transmission period information per group, and sequence pool information per group. For example, the grouping result information of the base stations may include at least one of center frequency information, bandwidth information, and region/location information of the base stations belonging to each group.

Figure 14:
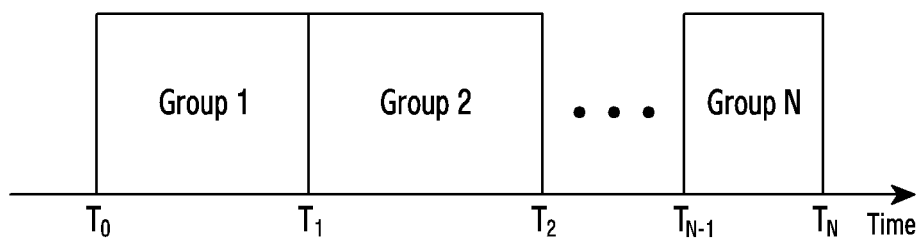
FIG. 14 illustrates an example of representation of a sequence transmission period per group in a wireless communication system according to an embodiment of the present disclosure.

For example, the transmission period information may be expressed as information indicating a timing as shown in FIG. 14. FIG. 14 illustrates a representation example of a sequence transmission period per group in a wireless communication system according to an embodiment of the present disclosure. Referring to FIG. 14, transmission periods allocated to a group1 are $T_0$ through $T_1$, transmission periods allocated to a group2 are $T_1$ through $T_2$, and transmission periods allocated to a groupN are $T_{N-1}$ through $T_N$. Herein, $T_n$ may be indicated based on one of a system frame index, a subframe index, a slot index, a symbol index, and a time value.

Figure 15:
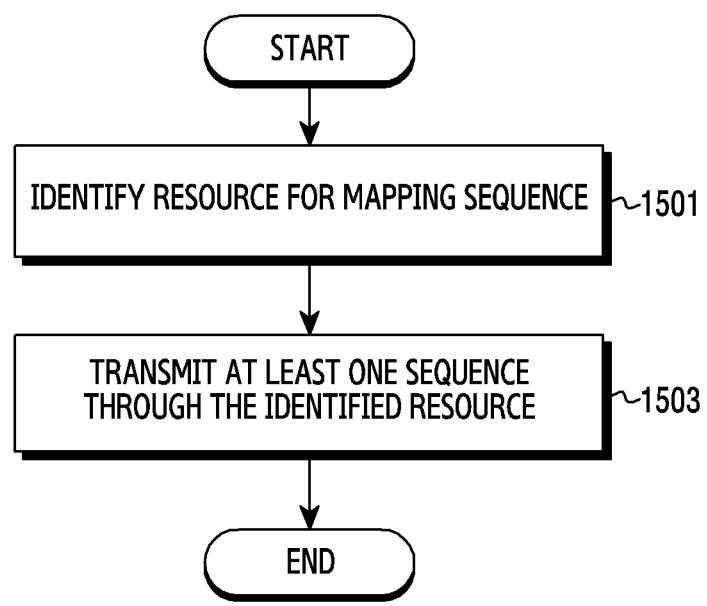
FIG. 15 illustrates a flowchart for operations of a base station which transmits a sequence in a wireless communication system according to an embodiment of the present disclosure.

FIG. 15 illustrates a flowchart for operations of a base station which transmits a sequence in a wireless communication system according to an embodiment of the present disclosure. FIG. 15 illustrates an operation method of an aggressor base station, for example, one of the base station 110, the base station 110-1, the base station 110-2, and the base station 110-3.

Referring to FIG. 15, in step 1501, the base station identifies a resource for mapping a sequence. For example, the base station may identify the resource based on information received from a management device (e.g., the management device 130). Herein, the resource includes a transmission opportunity/time/timing, a transmission period, and a transmission period, and so on. The resource may be specified based on at least one of a system frame, a subframe, a slot, and a symbol. For example, the information provided from the management device may include at least one of information indicating a sequence transmitted by at least one aggressor base station, information indicating a transmission opportunity of the aggressor base station, information indicating the resource for mapping the sequence, and indicating a group. Herein, the information indicating the transmission time may include information indicating a sequence transmission time of the aggressor base station or the group of the aggressor base station. A resource for monitoring may be identified based on a predefined correspondence between information items which may be provided from the management device. For example, the base station may identify the sequence, identify the transmission opportunity or the group corresponding to the sequence, and then identify the resource corresponding to the transmission opportunity and the group.

In step 1503, the base station transmits at least one sequence through the identified resource. After identifying the allocated sequence, the base station may map the sequence to the identified resource and transmit it. Herein, the allocated sequence may be identified based on the information received from the management device.

In the embodiment described with reference to FIG. 15, the base station identifies the resource based on the information provided from the upper device (e.g., the management device), and transmits the sequence. According to another embodiment, the base station may transmit at least one sequence, without intervention of the management device. For example, if the sequence and the resource for transmitting the sequence are predefined, the base station may transmit at least one sequence without information provided from the management device. For example, it may be defined to determine the scheduling of the sequence based on other information (e.g., identification information of the base station, operator information, etc.).

As aforementioned with reference to FIG. 15, the base station may identify the resource and the sequence, and transmit the sequence. Hereafter, examples of operations related to the sequence transmission of the base station are described, with reference to FIG. 16 through FIG. 21.

Figure 16:
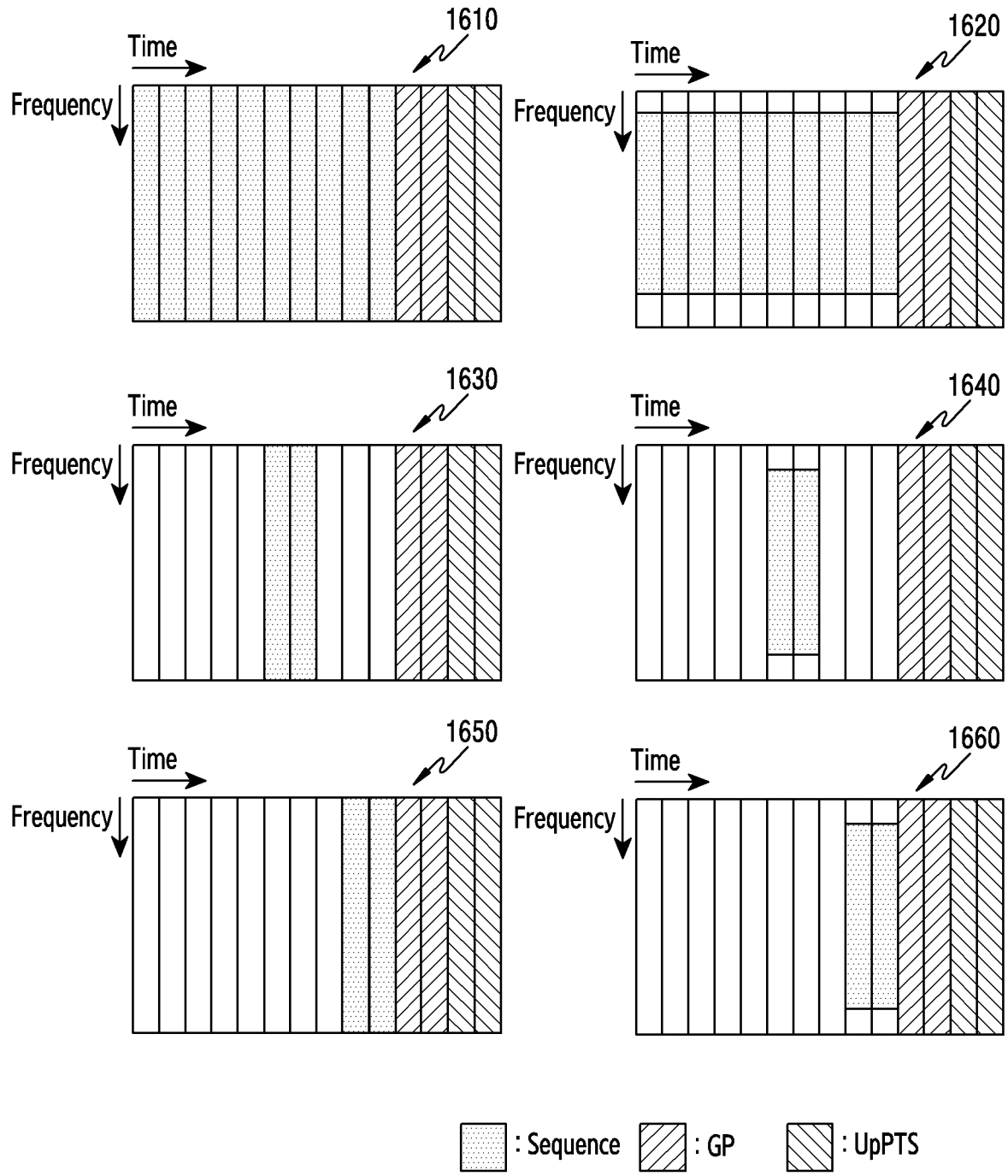
FIG. 16 illustrates examples of sequence mapping in a wireless communication system according to an embodiment of the present disclosure.

FIG. 16 illustrates examples of sequence mapping in a wireless communication system according to an embodiment of the present disclosure. As illustrated in FIG. 16, at least one sequence may be mapped to some or whole of the DwPTS of the special subframe. For example, at least one sequence may be mapped to all of subcarriers in the whole DwPTS as shown in a first example 1610, or may be mapped to some subcarriers in the whole DwPTS as shown in a second example 1620. As another example, at least one sequence may be mapped to all of subcarriers in the middle of the DwPTS as shown in a third example 1630, or may be mapped to some subcarriers in the middle of the DwPTS as shown in a fourth example 1640. As yet another example, at least one sequence may be mapped to all of subcarriers in the rear end of the DwPTS as shown in a fifth example 1650, or may be mapped to some subcarriers in the rear end of the DwPTS as shown in a sixth example 1660.

If at least one sequence is mapped to all the symbols of the DwPTS as shown in the first example 1610 and the second example 1620, the number of the symbols to monitor for sequence detection may be reduced. If at least one sequence is mapped to only part of the DwPTS and the remaining symbols are empty as shown in the third example 1630, the fourth example 1640, the fifth example 1650, and the sixth example 1660, the performance of aggressor detection may be improved. A cell-specific reference signal or common reference signal (CRS) may or may not exist in some resource element (RE) of the symbols to which the sequence is mapped.

In the examples shown in FIG. 16, at least one sequence is mapped to the consecutive symbols. However, according to another embodiment, at least one sequence may be mapped to noncontiguous symbols. For example, identical or different sequences may be mapped to the n-th and n+1-th symbols, and n+m-th and n+m+1-th symbols (m is an integer equal to or greater than 3).

The examples shown in FIG. 16 show the case in which at least one sequence is mapped in the special subframe. However, according to another embodiment, at least one sequence may be mapped to other subframe than the special subframe. For example, at least one sequence may be mapped to part or whole of the downlink subframe preceding the special subframe.

Figure 17:
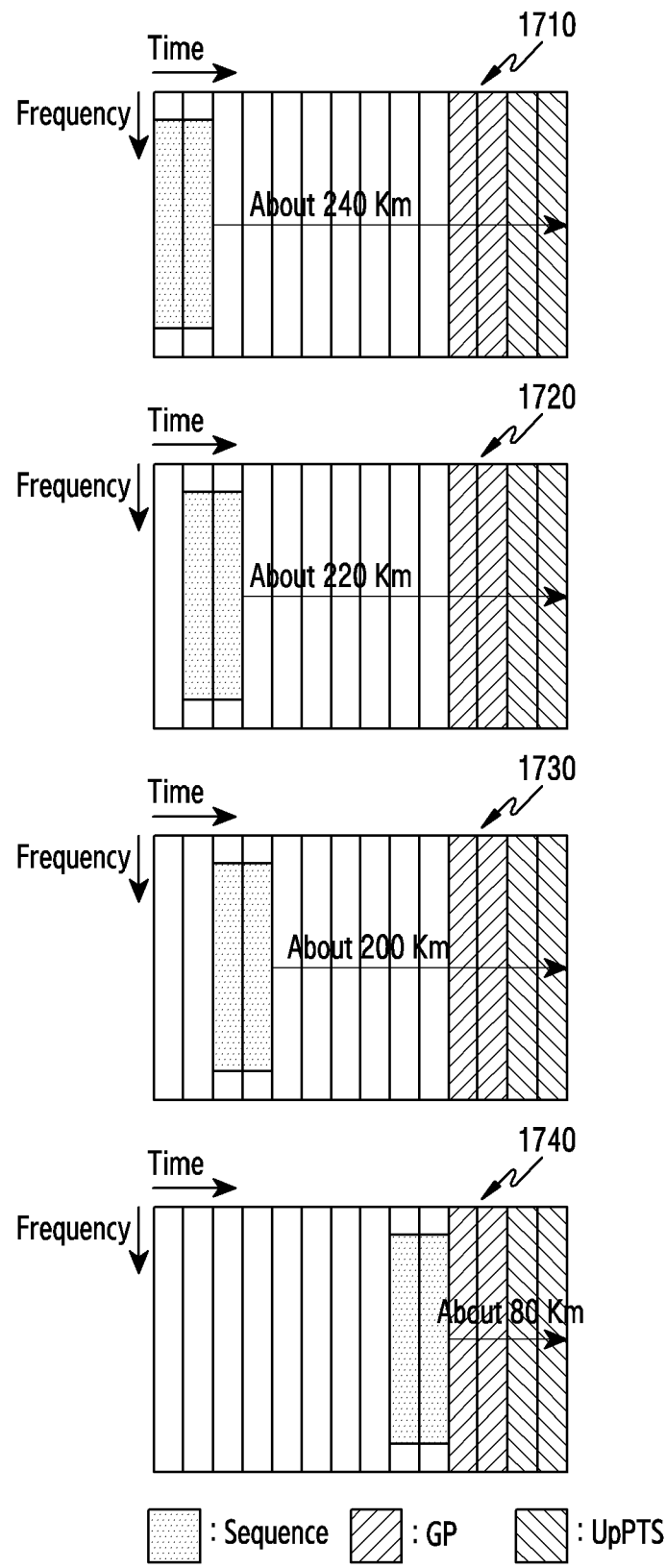
FIG. 17 illustrates examples of sequence mapping according to a distance in a wireless communication system according to an embodiment of the present disclosure.

As shown in some examples shown in FIG. 16, at least one sequence may be mapped to some symbols of the DwPTS. Herein, some symbols to which at least one sequence is mapped may differ according to the range of the aggressor to detect. FIG. 17 illustrates examples of sequence mapping according to a distance in a wireless communication system according to an embodiment of the present disclosure.

Referring to FIG. 17, symbols to which the sequence is mapped may be set according to a distance range of an aggressor to detect or a delay range. For example, to support detection of only an aggressor distant 240 km or more, the sequence may be mapped to 0-th and first symbols, in a first example 1710. For example, to support detection of only an aggressor distant 220 km or more, the sequence may be mapped to first and second symbols, in a second example 1720. For example, to support detection of only an aggressor distant 200 km or more, the sequence may be mapped to second and third symbols, in a third example 1730. For example, to support detection of only an aggressor distant 80 km or more, the sequence may be mapped to eighth and ninth symbols, in a fourth example 1740. That is, as the minimum value of the distance range of the aggressor to detect is smaller, the symbol to which the sequence is mapped becomes closer to the rear end of the DwPTS.

Figure 18:
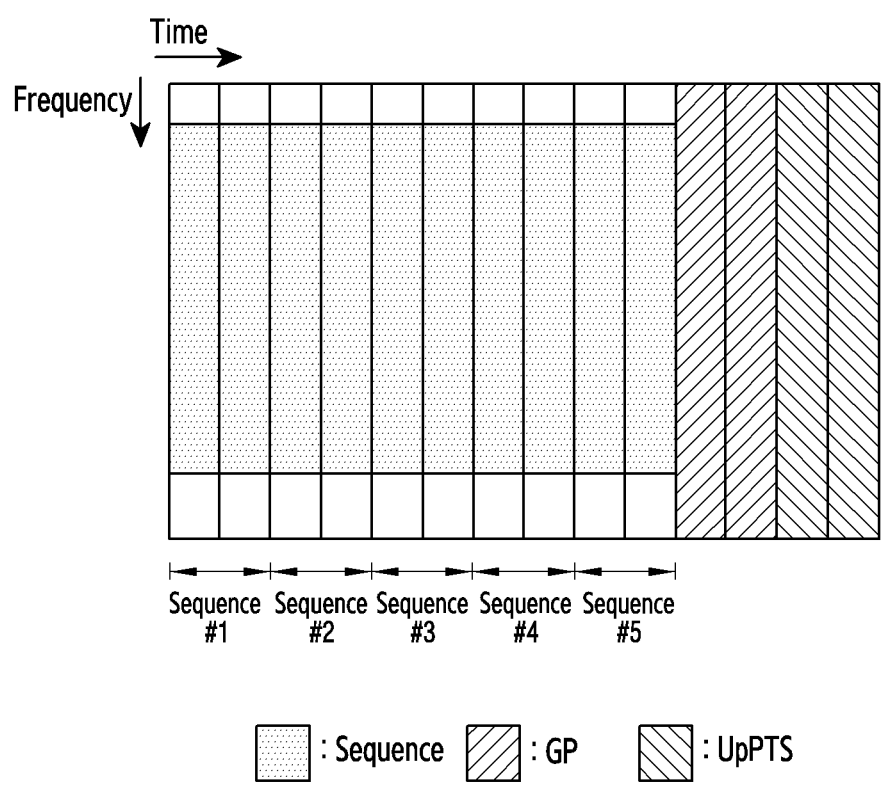
FIG. 18 illustrates an example of mapping for using a plurality of sequences in a wireless communication system according to an embodiment of the present disclosure.

According to an embodiment, the aggressor base station may transmit a plurality of different sequences within one subframe. FIG. 18 illustrates a mapping example for using a plurality of sequences in a wireless communication system according to an embodiment of the present disclosure. Referring to FIG. 18, one of sequences belonging to different sequence groups may be mapped for each symbol index of the DwPTS of the special subframe. For example, as shown in FIG. 18, a sequence #1 may be mapped to 0-th and first symbols, a sequence #2 may be mapped to second and third symbols, a sequence #3 may be mapped to fourth and fifth symbols, a sequence #4 may be mapped to sixth and seventh symbols, and a sequence #5 may be mapped to eighth and nineth symbols.

If the mapping shown in FIG. 18 is applied, delay may be estimated according to the group to which the detected sequence belongs. That is, the mapping scheme illustrated in FIG. 18 may be used for the detector base station to estimate the propagation delay for the signal of the aggressor base station by using only the UpPTS. The detector base station may detect at least one sequence from the signal received during the UpPTS, estimate the propagation delay by identifying the group to which the detected sequence belongs, and estimate the distance to the base station transmitting the sequence based on the propagation delay.

As described with reference to FIG. 16 through FIG. 18, the sequence may be mapped to the resource according to various patterns. Available mapping patterns may include not only the patterns explained with reference to FIG. 16 through FIG. 18, but also other patterns, for example, combinations of the illustrated patterns. At least some of the various patterns may be selectively used.

According to an embodiment, the available mapping patterns in the system may be restricted. For example, the available mapping patterns in the system standard may be restrictively defined. Alternatively, the available mapping patterns of the management device may be restricted, and pool information including the restricted mapping patterns may be provided to the base stations.

According to an embodiment, the mapping pattern may be adaptively selected by the base station or the management device, among all the mapping patterns or the restricted mapping patterns. For example, the management device may determine a required interference measurement range (e.g., a geographic aspect, an accuracy aspect, etc.) based on an input of a user (e.g., a network operator), and allocate and notify mapping patterns according to the determined range.

Figure 19:
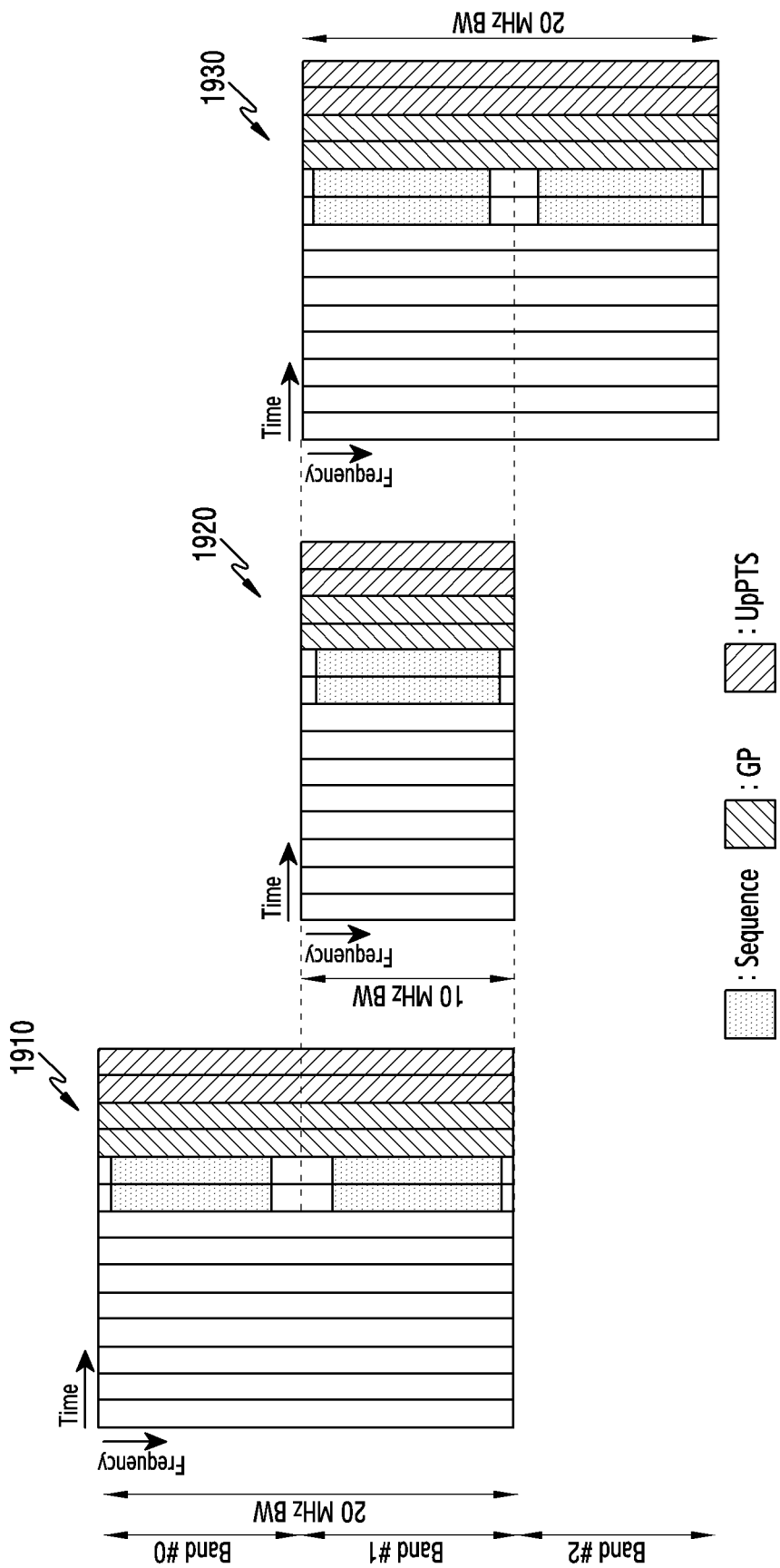
FIG. 19 illustrates an example of sequence mapping in consideration of an operating frequency in a wireless communication system according to an embodiment of the present disclosure.

The bandwidth used by the base station may be a multiple of the minimum bandwidth. For example, if the minimum bandwidth is 10 MHz, some aggressor base station may use 20 MHz bandwidth. In this case, sequences may be mapped as shown in FIG. 19. FIG. 19 illustrates an example of sequence mapping in consideration of an operating frequency in a wireless communication system according to an embodiment of the present disclosure. FIG. 19 illustrates a case of mapping an independent sequence for each unit band, as the sequence mapping considering an environment where base stations using different bandwidths are mixed. Herein, the unit band indicates a band having the minimum bandwidth available for the communication.

Referring to FIG. 19, a first example 1910 represents a case using 20 MHz bandwidth including a band #0 and a band #1, a second example 1920 represents a case using 10 MHz bandwidth including the band #1, and a second example 1930 represents a case using 20 MHz bandwidth including the band #1 and the band #2. If using the 20 MHz bandwidth, the independent sequence may be mapped in each of the two bands of the 10 MHz bandwidth. Hence, even if only the 10 MHz bandwidth is monitored, the sequence may be detected. That is, considering that only the 10 MHz band which is a part of the 20 MHz bandwidth overlaps, the sequence may be mapped and transmitted in each of the 10 MHz band of a low frequency area and the 10 MHz band of a high frequency. If using 10 MHz bandwidth, one sequence may be mapped in the band of 10 MHz bandwidth.

Figure 20:
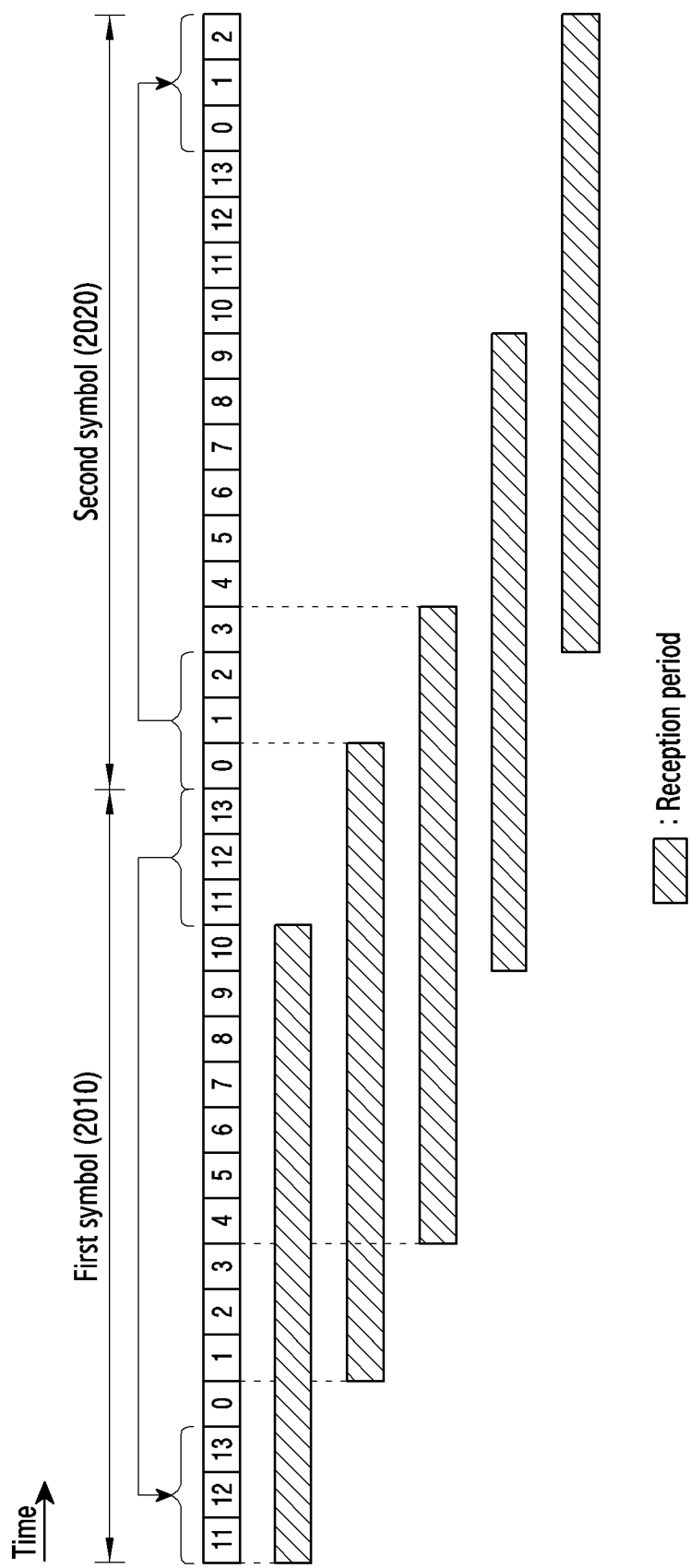
FIG. 20 illustrates an example of a structure of symbols including a sequence in a wireless communication system according to an embodiment of the present disclosure.

FIG. 20 illustrates an example of a structure of symbols including a sequence in a wireless communication system according to an embodiment of the present disclosure. FIG. 20 exemplifies a symbol recurring structure. Referring to FIG. 20, considering long delay exceeding a length of a cyclic prefix (CP) of one symbol, a first symbol 2010 is generated by adding a rear part of the symbol to the front end, and a second symbol 2020 is generated by adding a front part of the symbol to the rear end. Since interference between base stations considered in the present disclosure is caused by a signal transmitted from a long distance, the delay may be longer than the CP of one symbol. Hence, by configuring the symbols in the structure as shown in FIG. 20, a timing offset range coverable without signal loss may be increased.

Figure 21:
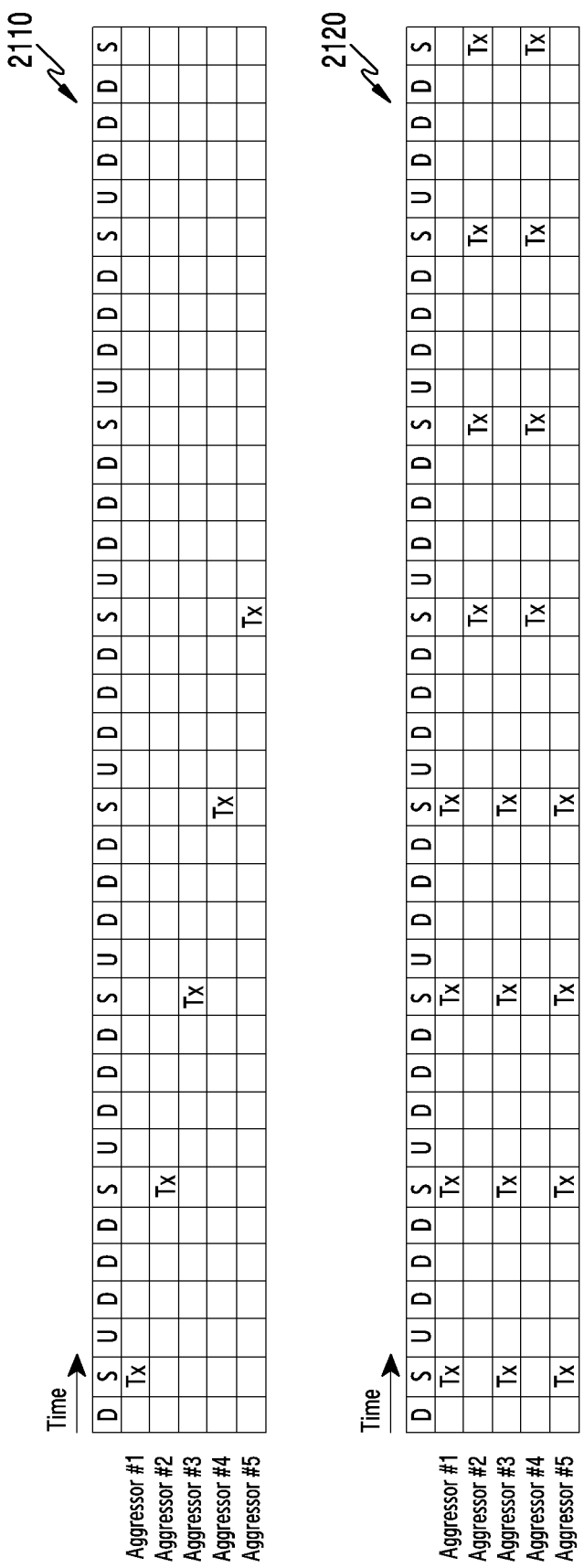
FIG. 21 illustrates a management example of a sequence transmission period in a wireless communication system according to an embodiment of the present disclosure.

FIG. 21 illustrates a management example of a sequence transmission period in a wireless communication system according to an embodiment of the present disclosure. FIG. 21 exemplifies management schemes of two transmission periods.

Referring to FIG. 21, in a first example 2110, aggressors sequentially transmit sequences at consecutive transmission times. In a second example 2120, some of the aggressors simultaneously transmit sequences in consecutive transmission times, and the rest of the aggressors simultaneously transmit sequences in consecutive transmission times. The first example 2110 is the scheme for setting a short sequence transmission period, and the second example 2120 is the scheme for repeatedly transmitting the sequence for a specific period to improve aggressor detection performance.

Figure 22:
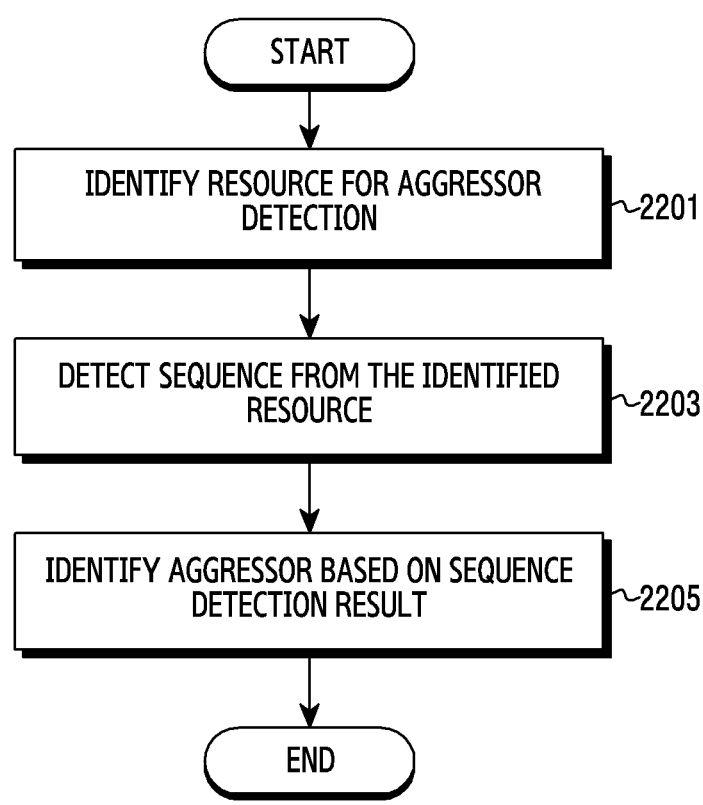
FIG. 22 is a flowchart for operations of a base station for detecting a sequence in a wireless communication system according to an embodiment of the present disclosure.

FIG. 22 illustrates a flowchart for operations of a base station for detecting a sequence in a wireless communication system according to an embodiment of the present disclosure. FIG. 22 illustrates an operating method of a detector base station, for example, the base station 120.

Referring to FIG. 22, in step 2201, the base station identifies a resource for aggressor detection. In other words, the base station identifies the resource for monitoring the sequence, that is, for attempting the sequence detection. According to an embodiment, the resource for monitoring the sequence may be identified based on information provided from a management device (e.g., the management device 130). For example, the information provided from the management device may include at least one of information indicating a sequence transmitted by at least one aggressor base station, information indicating a transmission opportunity of the aggressor base station, information indicating the resource for mapping the sequence, and information indicating a group. Herein, the information indicating the transmission time may include information indicating the sequence transmission time of the aggressor base station or a group to which the aggressor base station belongs. The resource for monitoring may be identified based on a predefined correspondence between information items which may be provided from the management device. For example, the base station may identify the sequence, identify the transmission opportunity or the group corresponding to the sequence, and then identify the resource corresponding to the transmission opportunity and the group.

In step 2203, the base station detects at least one sequence from the identified resource. The base station may detect a plurality of sequences in a plurality of periods. That is, the base station may detect the plurality of the sequences over a plurality of detection opportunities. According to an embodiment, the base station may attempt to detect the sequence according to the sequence transmission time of at least one aggressor base station. According to another embodiment, the base station may determine at least one candidate sequence based on sequence information of the at least one aggressor base station, and attempt the sequence detection. According to yet another embodiment, the base station may attempt the sequence detection based on grouping result information of the aggressor base stations. For example, the base station may identify the sequence transmission period per group, and attempt to detect sequences allocated to the group during the identified transmission period.

In step 2205, the base station identifies at least one aggressor based on a sequence detection result. The base station may identify at least one aggressor base station based on the sequence detection result and the information provided from the management device. For example, the information provided from the management device may include at least one of information (e.g., a bandwidth, a center frequency) relating to an operating frequency of at least one aggressor base station, information of the sequence to transmit, and location information.

In the operations described with reference to FIG. 22, the base station identifies the aggressor. However, according to another embodiment, the base station may perform the detection and the measurement on the sequence, and the aggressor may be identified by other device (e.g., a management device). In this case, step 2205 of FIG. 22 may be replaced with an operation of transmitting the sequence detection result or information derived from the detection result to the management device.

In the embodiment described with reference to FIG. 22, the base station monitors the sequence based on the information provided from the upper device (e.g., the management device). According to another embodiment, the base station may monitor at least one sequence, without intervention of the management device. For example, if the sequence, and the resource for transmitting the sequence are predefined, the base station may determine the resource for monitoring at least one sequence without the information provided from the management device. For example, it may be defined to determine scheduling of the sequence based on other information (e.g., identification information of the base station, operator information, etc.).

As described with reference to FIG. 22, the base station may detect the sequence from the identified resource, and identify the aggressor. Hereafter, examples of operations related to the sequence reception of the base station are described, with reference to FIG. 23 through FIG. 27.

Figure 23:
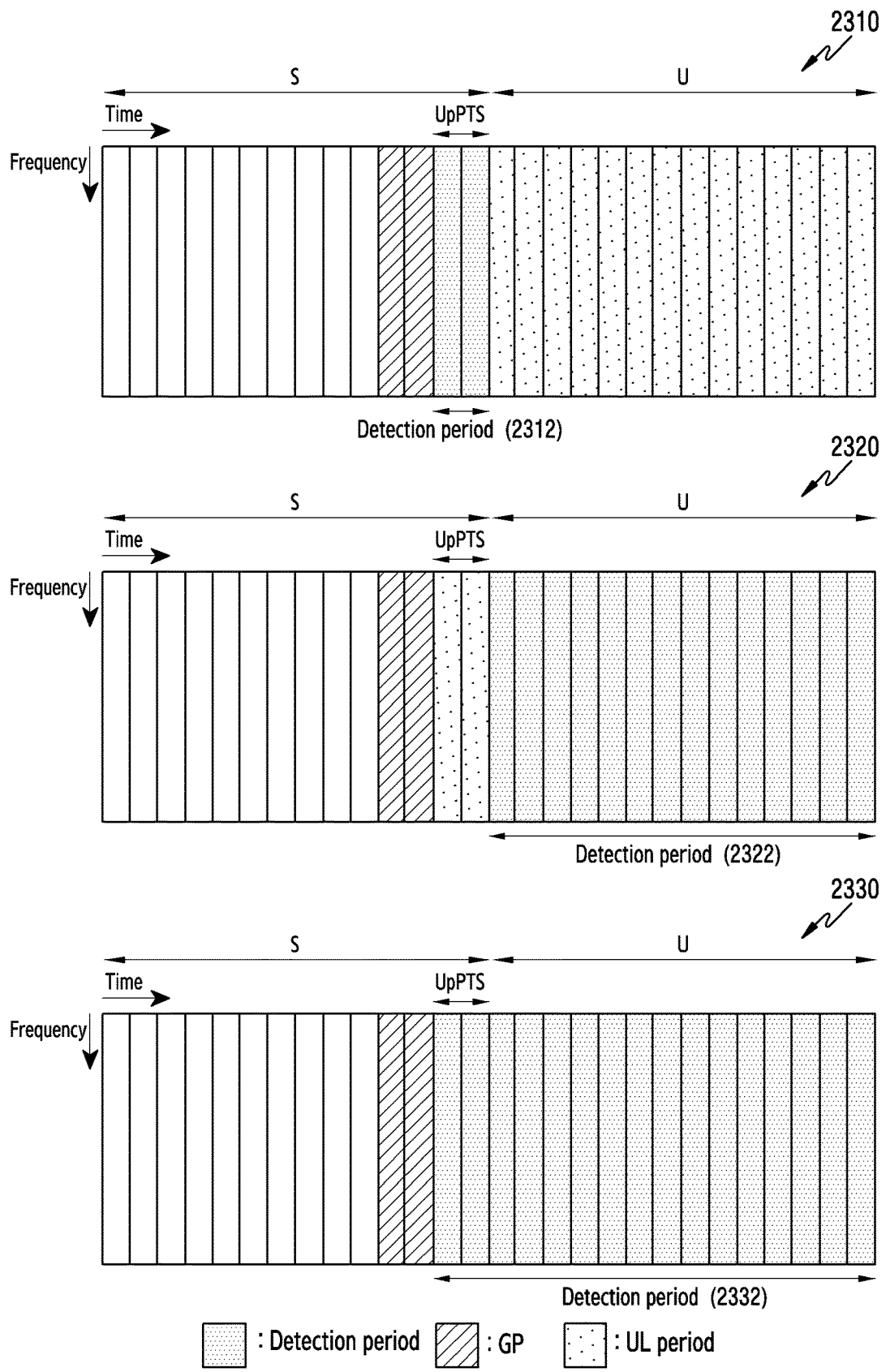
FIG. 23 illustrates examples of a monitoring period for detecting a sequence in a wireless communication system according to an embodiment of the present disclosure.

The detector base station attempts to detect the sequence transmitted by the aggressor base station during at least one transmission period. The transmission period for monitoring the sequence may be referred to as a 'detection period', a 'monitoring period', a 'sequence collection period', or other term having the equivalent technical meaning. According to an embodiment, the detection period may be configured as shown in FIG. 23. FIG. 23 illustrates examples of a monitoring period for detecting a sequence in a wireless communication system according to an embodiment of the present disclosure.

Referring to FIG. 23, the detection period may be configured in an UpPTS of a special subframe and at least a part of a subsequent uplink frame. For example, in a first example 2310, the UpPTS of the special subframe may be configured as a detection period 2312. As another example, in a second example 2320, the uplink subframe following the special subframe may be configured as a detection period 2322. As another example, in a third example 2330, the UpPTS of the special subframe and the subsequent uplink subframe may be configured as a detection period 2332. The whole UpPTS is included in the detection period in the first example 2310 and the third example 2310, but according to another embodiment, a part of the UpPTS may be included in the detection period.

One of the various detection periods as in the above-described examples may be selectively used according to the distance range of the aggressor base station to detect. Selecting the detection period may be selectively performed by the detector base station, or may be controlled by the management device. According to an embodiment, detection periods of different sizes and positions may be sequentially used over a plurality of detection opportunities.

As described with reference to FIG. 23, at least a part of the uplink subframe following the special subframe may be included in the detection period. If the uplink subframe includes at least a part of the detection period, the detector base station may or may not schedule uplink communication in the corresponding uplink subframe. If scheduling the uplink communication in the uplink subframe including at least a part of the detection period, the detector base station may use only the part of the uplink subframe for the uplink communication. Hence, the detector base station may use only a modulation and coding scheme (MCS) below a specific level, for the sake of stable uplink traffic reception.

Whether to perform the uplink communication in the uplink subframe including at least a part of the detection period may be fixedly defined, or may be adaptively determined. If whether to perform the uplink communication is adaptively determined, whether to perform the uplink communication may be determined based on at least one of an uplink traffic amount to be transmitted, a buffer status of terminals being accessed, a service type provided to the accessing terminals, and the number of the accessing terminals.

Figure 24A:
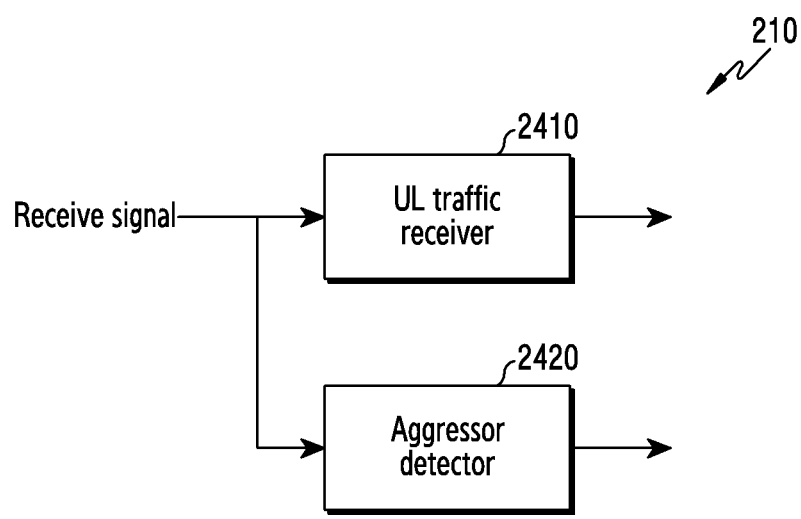
FIGS. 24A through 24H illustrate configuration examples of a receiving circuit for detecting a sequence in a wireless communication system according to an embodiment of the present disclosure.
Figure 24B:
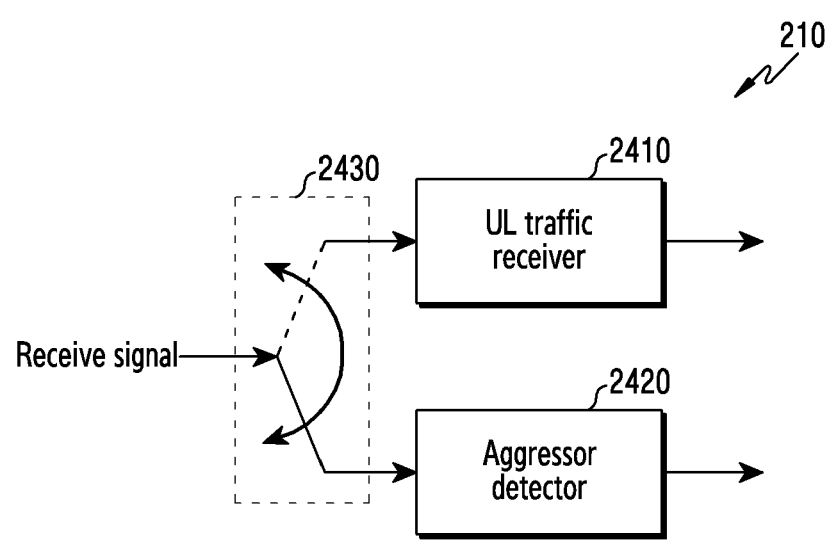

A receiving circuit included in a wireless communication unit (e.g., the wireless communication unit 210) may be configured as shown in FIG. 24A or FIG. 24B according to whether the uplink communication is performed in the uplink subframe including at least a part of the detection period. In FIG. 24A and FIG. 24B, an uplink (UL) traffic receiver 2410 detects traffic data by processing an UL signal received from a terminal. For example, the UL traffic receiver 2410 may demodulate and decode the uplink signal, and perform error check (e.g., cyclic redundancy check (CRC)). An aggressor detector 2420 detects a sequence from a signal received during the detection period. For example, the aggressor detector 2420 may perform a correlation operation between the signal received during the detection period and a candidate sequence, and determine the received sequence based on a result of the correlation operation.

If the UL communication is performed in the UL subframe including at least a part of the detection period, the receiving circuit may be configured to provide the received signal to both the UL traffic receiver 2410 and the aggressor detector 2420, as shown in FIG. 24A. Accordingly, the UL traffic receiver 2410 and the aggressor detector 2420 may operate simultaneously using the signals received in the corresponding UL subframe.

If the UL communication is not performed in the UL subframe including at least a part of the detection period, the receiving circuit may further include a switch 2430, to selectively provide the received signal to one of the UL traffic receiver 2410 and the aggressor detector 2420, as shown in FIG. 24A. In this case, the UL subframe including at least a part of the detection period is treated as reserved for the detection of the aggressor base station, and is not used for the UL communication. Hence, the detector base station may reserve at least one UL subframe according to the detection period distribution, and control the switch 2430 to provide a signal received in the reserved uplink subframe to the aggressor detector 2420. For example, the switch 2430 may be controlled by information (e.g., an index, a subframe number, etc.) indicating the UL subframe for the aggressor detection, that is, the UL subframe including the detection period.

Both the signal of the aggressor base station and the signal of the terminal may be received in the UL subframe, but the signal of the aggressor base station is the downlink signal and the signal of the terminal is the UL signal. In some communication systems, frequency shift of a specific value may be applied to the UL signal. For example, in the LTE system, the frequency shift of 7.5 kHz is applied to the UL signal. As another example, in the NR system, the frequency shift of 7.5 kHz may be applied to the UL signal, selectively (e.g., if transform precoding is applied) according to the configuration of the base station. If the frequency shift is applied, an operation of compensating the shifted frequency value is required, to process the UL signal. However, in the downlink signal, it is necessary to compensate the frequency shift of a different value (e.g., 0). That is, the value of the compensated frequency offset may differ depending on the signal to detect, which is received in the UL subframe, Considering the operation of compensating for the frequency offset, the receiving circuit may be configured as shown in FIG. 24C through FIG. 24F. In FIG. 24C through FIG. 24F, a first frequency offset compensator 2450 compensates for a first frequency shift value (e.g., 7.5 kHz) applied to the UL signal. However, if the frequency shift is not applied to the UL signal according to the configuration, the first frequency offset compensator 2450 may disable the compensation operation and bypass the signal. A second frequency offset compensator 2460 compensates for a second frequency shift value (e.g., 0 kHz) applied to the downlink signal of the aggressor base station. A third frequency offset compensator 2470 compensates for a third frequency offset which is a difference of the first frequency shift value and the second frequency shift value. As such, to detect the sequence transmitted from the aggressor base station, a separate component for compensating for the frequency offset, which is different from the frequency offset compensation for processing the UL signal, is required.

Figure 24C:
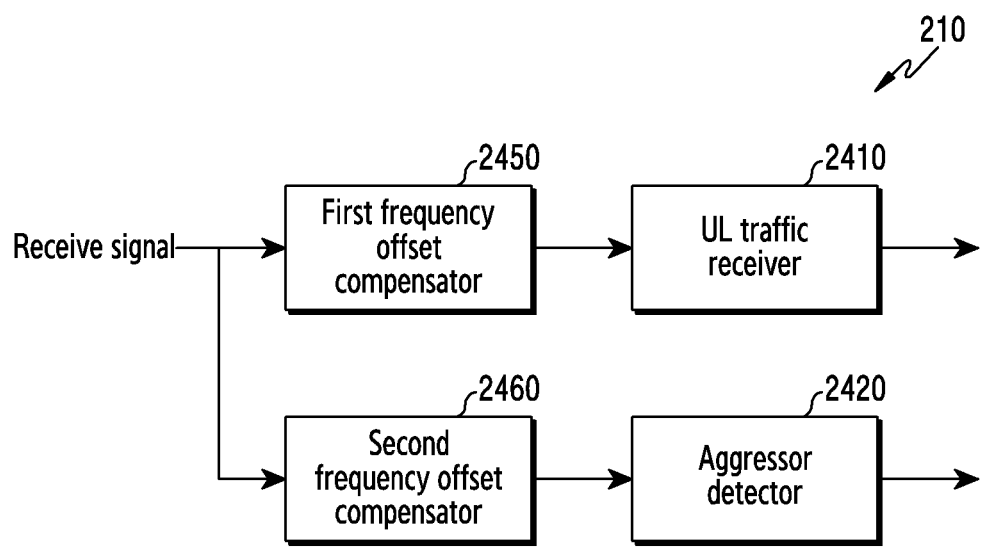
Figure 24D:
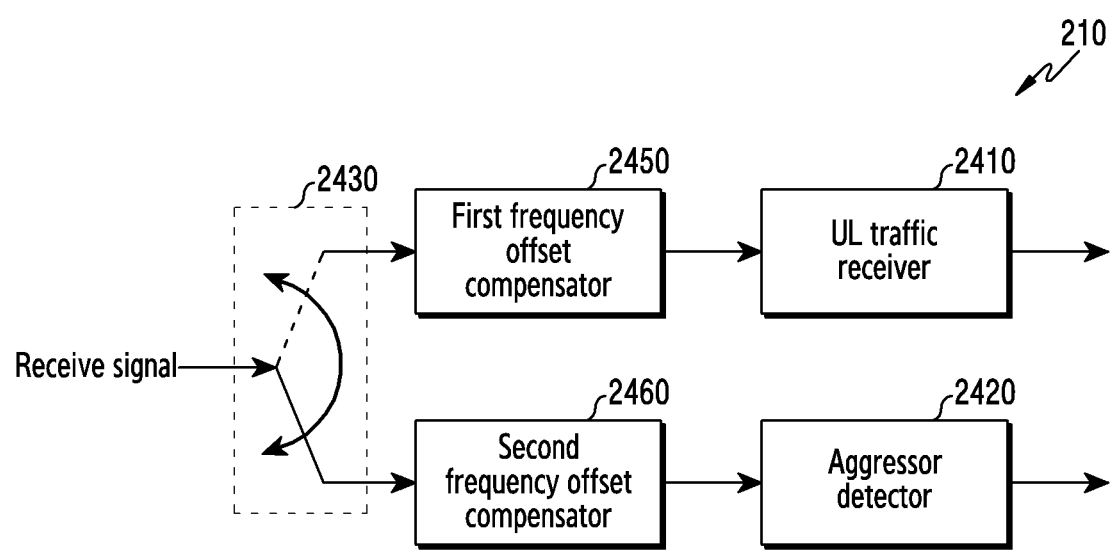

FIG. 24C and FIG. 24D are a case in which the receiving circuit is configured using the first frequency offset compensator 2450 and the second frequency offset compensator 2460, with a difference that the switch 2430 is included or not, similarly to FIG. 24A and FIG. 24B. In FIG. 24C and FIG. 24D, the UL signal is processed by the UL traffic receiver 2410, after the frequency shift compensation by the first frequency offset compensator 2450. The signal transmitted by the aggressor base station is processed by the aggressor detector 2420, after the frequency shift compensation by the second frequency offset compensator 2460.

Figure 24E:
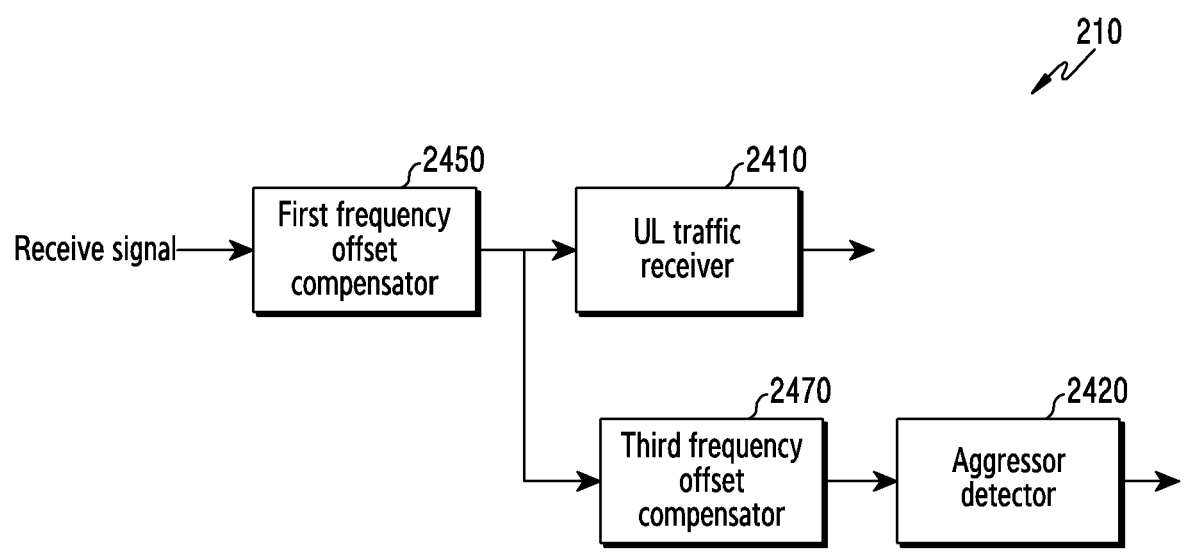
Figure 24F:
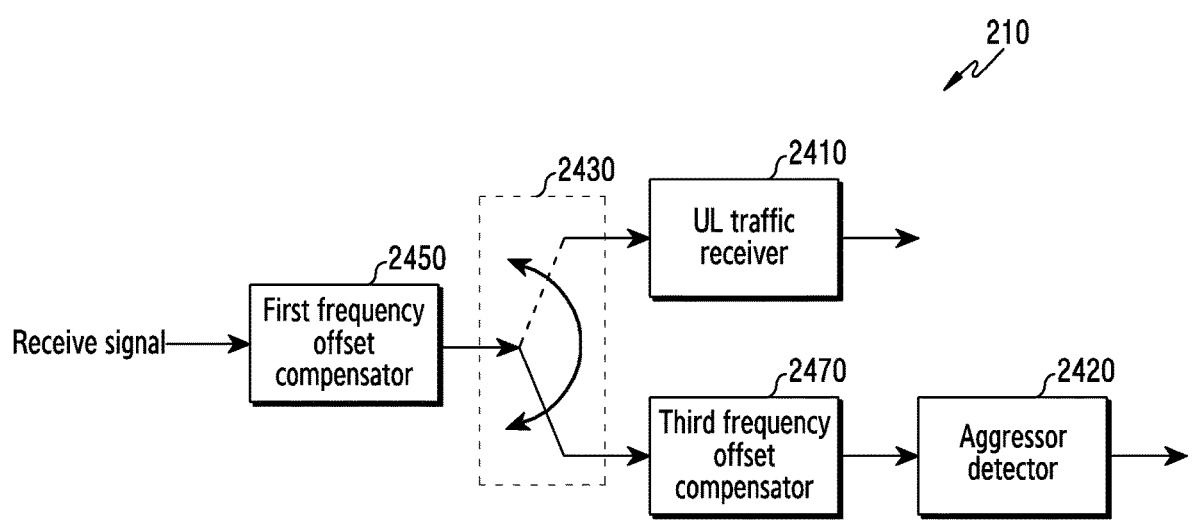

Similarly, FIG. 24E and FIG. 24F are a case in which the receiving circuit is configured using the first frequency offset compensator 2450 and the third frequency offset compensator 2470, with the difference that the switch 2430 is included or not, similarly to FIG. 24A and FIG. 24B. In FIG. 24E and FIG. 24F, the UL signal is processed by the UL traffic receiver 2410, after the frequency shift compensation by the first frequency offset compensator 2450. The signal transmitted by the aggressor base station is processed by the aggressor detector 2420, after the frequency shift compensation by the first frequency offset compensator 2450 and the third frequency offset compensator 2470.

In detecting the sequence from the signal transmitted by the aggressor base station, the difference of the center frequency between the aggressor base station and the detector base station may be considered. That is, if the aggressor base station and the detector base station use different center frequencies, an operation of compensating for a frequency offset difference between resource elements (REs) may be required. If the center frequencies of the aggressor base station and the detector base station are the same, there may be no additional frequency offset between the REs of the aggressor base station and the detector base station, by compensating for only the offset by the above-described frequency shift. However, if the center frequencies of the aggressor base station and the detector base station are different, an additional frequency offset may exist between the REs of the aggressor base station and the detector base station, even though the offset due to the frequency shift is compensated.

Figure 24G:
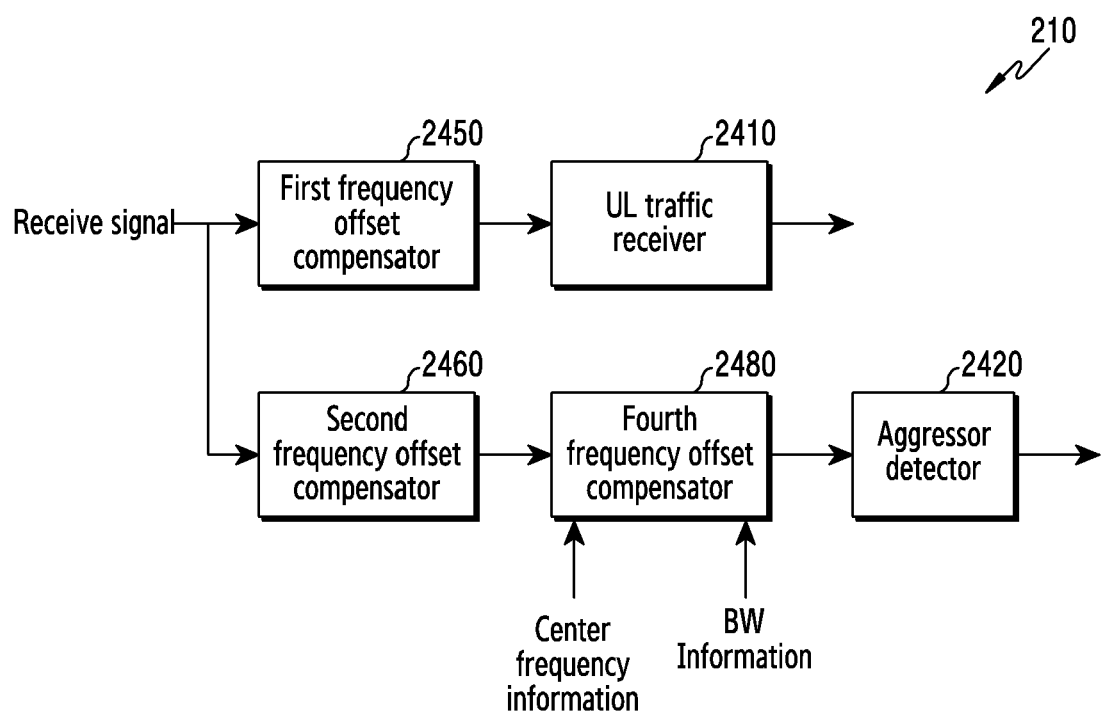
Figure 24H:
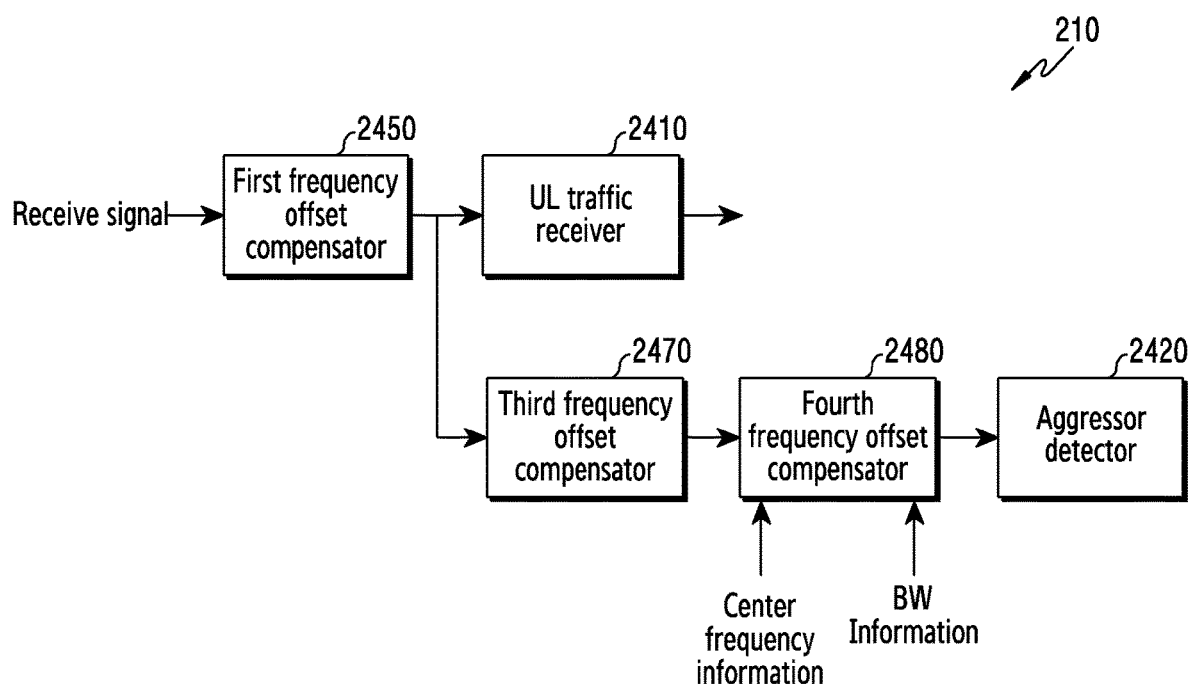

Considering the operation of compensating for the frequency offset due to the difference of the center frequency, the receiving circuit may be configured as shown in FIG. 24G and FIG. 24H. In FIG. 24G and FIG. 24H, a fourth frequency offset compensator 2480 compensates for the frequency offset due to the center frequency difference. For doing so, the fourth frequency offset compensator 2480 may determine the offset frequency value based on center frequency information and bandwidth information of the aggressor base station and the detector base station, and compensate for the determined frequency value. If the center frequencies of the aggressor base station and the detector base station are the same, the offset value compensated by the fourth frequency offset compensator 2480 may be set to 0.

FIG. 24G illustrates a case in which the receiving circuit is configured using the first frequency offset compensator 2450, the third frequency offset compensator 2470, and the fourth frequency offset compensator 2480. In FIG. 24G, the UL signal is processed by the UL traffic receiver 2410, after the frequency shift compensation by the first frequency offset compensator 2450. The signal transmitted by the aggressor base station is processed by the aggressor detector 2420, after the frequency offset compensation by the second frequency offset compensator 2460 and the fourth frequency offset compensator 2490.

FIG. 24H illustrates a case in which the receiving circuit is configured using the first frequency offset compensator 2450, the third frequency offset compensator 2470, and the fourth frequency offset compensator 2480. In FIG. 24G, the UL signal is processed by the uplink traffic receiver 2410, after the frequency shift compensation by the first frequency offset compensator 2450. The signal transmitted by the aggressor base station is processed by the aggressor detector 2420, after the frequency offset compensation by the first frequency offset compensator 2450, the third frequency offset compensator 2470 and the fourth frequency offset compensator 2490.

In the 5G NR system, subcarrier spacings (SCSs) of the aggressor base station and the detector base station may be different from each other. In this case, the aggressor detector 2420 may process the received signal by considering the SCS. If SCS information is provided from the management device, the aggressor detector 2420 may adjust a setting value for the signal processing according to the provided information. If the SCS information is not provided, the aggressor detector 2420 may consider a plurality of SCSs in a blind manner.

Figure 25:
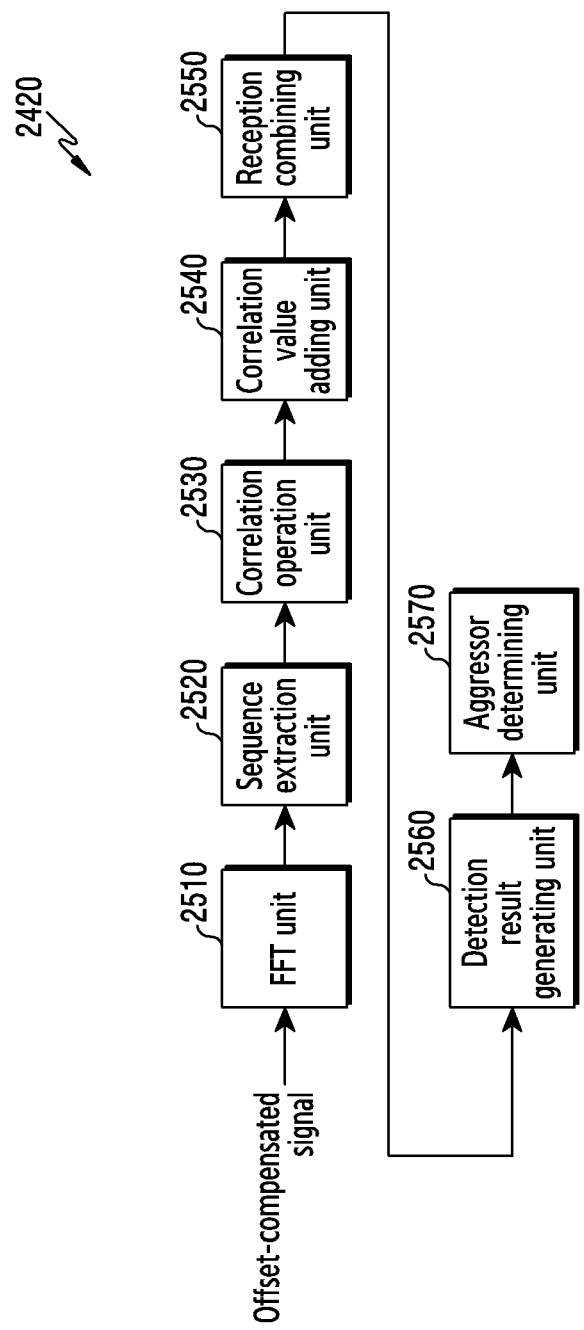
FIG. 25 illustrates a functional structure of a base station for determining an aggressor in a wireless communication system according to an embodiment of the present disclosure.

The aggressor detector 2420 illustrated in FIG. 24A through FIG. 24H may be configured as shown in FIG. 25. FIG. 25 illustrates a functional structure of a base station for determining an aggressor in a wireless communication system according to an embodiment of the present disclosure.

Referring to FIG. 25, an aggressor detector 2420 includes a fast fourier transform (FFT) operation unit 2510, a sequence extraction unit 2520, a correlation operation unit 2530, a correlation value adding unit 2540, a reception combining unit 2550, a detection result generating unit 2560, and an aggressor determining unit 2570.

The FFT operation unit 2510 performs an FFT operation on an offset-compensated signal. A received signal is converted into symbol values per subcarrier by the FFT operation. The sequence extraction unit 2520 extracts symbol values included in a sequence among the symbol values per subcarrier acquired through the FFT operation. The correlation operation unit 2530 performs a correlation operation between the extracted symbol values, that is, the extracted symbol sequence and a candidate sequence. The correlation value adding unit 2540 adds the correlation values. For example, the correlation value adding unit 2540 may operate based on an inverse FFT (IFFT) operation.

The reception combining unit 2550 combines the correlation value adding results with respect to a plurality of receive antennas. For example, if the base station uses four receive antennas, the FFT operation, the sequence extraction, the correlation operation, the correlation value addition, and so on may be performed on signals received through each antenna, and then the reception combining unit 2550 may sum the result values corresponding to the antennas based on the same weight or different weights. However, the reception combining unit 2550 is used if the detector base station supports a multi-antenna based reception operation, and may be excluded from the aggressor detector 2420 if the multi-antenna based reception operation is not supported.

The detection result generating unit 2560 generates analysis data related to the sequence detection. For example, the analysis data may include at least one of a channel power, a noise power, a peak generation position (e.g., a symbol index), and a peak sample position for each candidate sequence. The aggressor determining unit 2570 may identify a valid aggressor base station based on the analysis data.

In the embodiment described with reference to FIG. 25, the base station includes an aggressor determining unit 2570. That is, the base station may identify a valid aggressor base station. According to another embodiment, identifying the valid aggressor base station may be performed by other device (e.g., a management device). In this case, the base station may not include the aggressor determining unit 2570, and the analysis data may be reported to other device.

In the embodiment described with reference to FIG. 25, the sequence extracting unit 2520 extracts the symbol values included in the sequence among the symbol values per subcarrier. The sequence extracting unit 2520 may operate based on information received from the management device. For example, the information received from the management device may include at least one of sequence transmission time information of the aggressor base station, center frequency information of the aggressor base station, and bandwidth information of the aggressor base station. In this case, the extraction operation by the sequence extracting unit 2520 may be carried out as shown in FIG. 26A through FIG. 26F below.

FIG. 26A through FIG. 26F illustrate examples of regions for extracting a signal including a sequence in a wireless communication system according to an embodiment of the present disclosure. In FIG. 26A through FIG. 26F, the left side illustrates the operating frequency of the aggressor base station, and the right side illustrates the operating frequency of the detector base station.

Figure 26A:
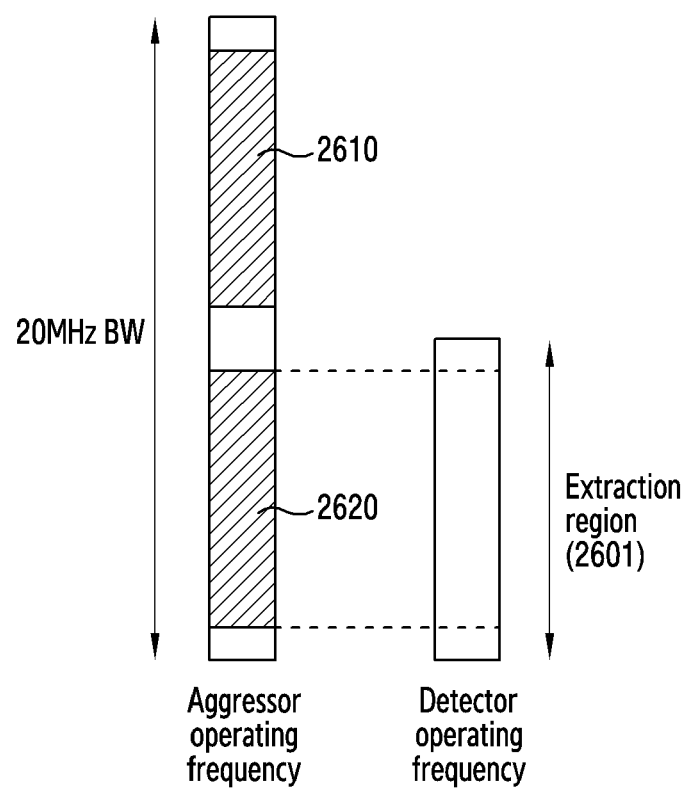
FIGS. 26A through 26F illustrate examples of regions for extracting a signal including a sequence in a wireless communication system according to an embodiment of the present disclosure.

Referring to FIG. 26A, the aggressor base station uses 20 MHz bandwidth including two base bands having 10 MHz bandwidth. Hence, a signal transmitted from the aggressor base station includes one each for band, that is, two sequences 2610 and 2620. The detector base station uses 10 MHz bandwidth, and the center frequency of the detector base station exists in the lower band. Accordingly, the detection region 2601 may be set in the lower band, and the sequence 2620 may be extracted.

Figure 26B:
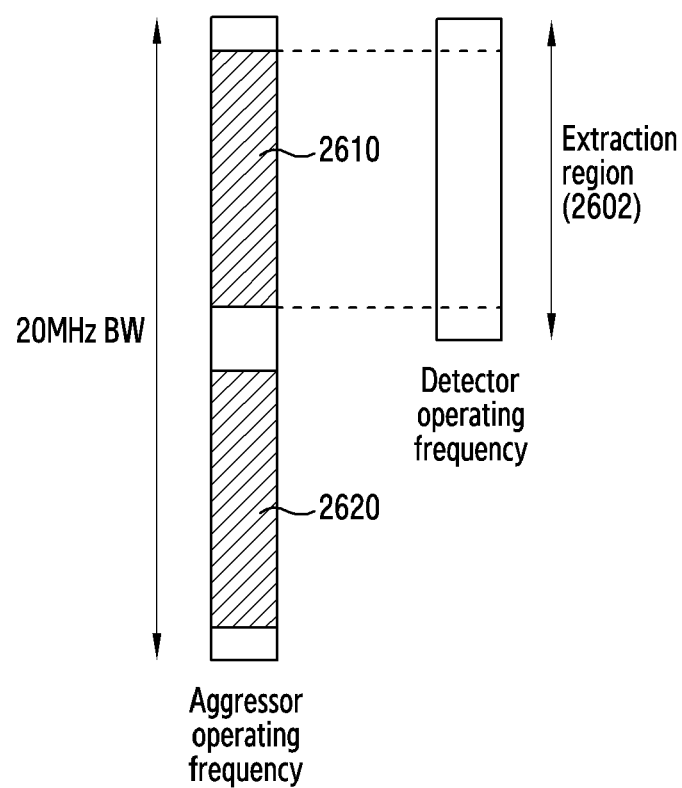

Referring to FIG. 26B, the aggressor base station uses 20 MHz bandwidth including two base bands having 10 MHz bandwidth. Hence, the signal transmitted from the aggressor base station includes one each for band, that is, two sequences 2610 and 2620. The detector base station uses 10 MHz bandwidth, and the center frequency of the detector base station is in the upper band. Accordingly, the detection region 2602 may be set in the upper band, and the sequence 2610 may be extracted.

Figure 26C:
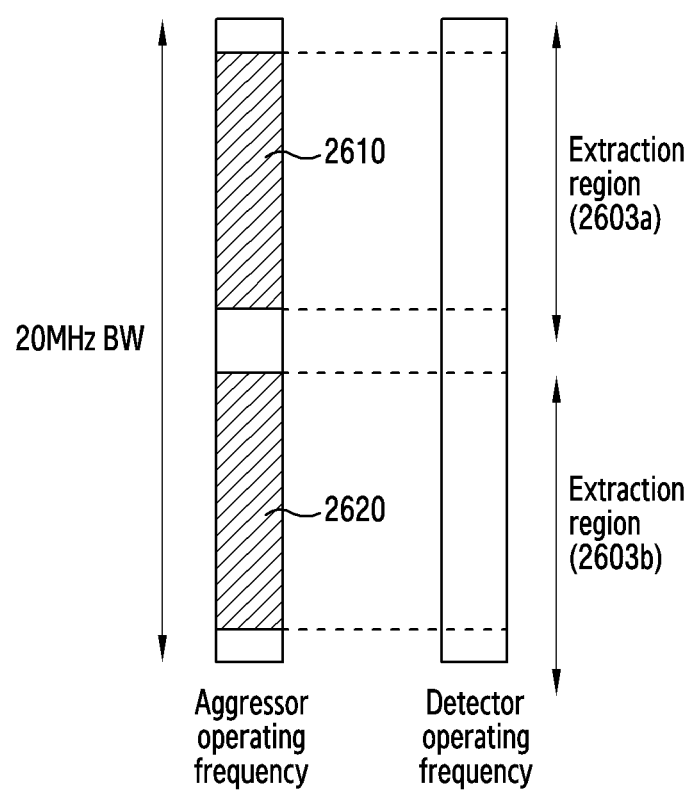

Referring to FIG. 26C, the aggressor base station uses 20 MHz bandwidth including two base bands having 10 MHz bandwidth. Hence, the signal transmitted from the aggressor base station includes one each for band, that is, two sequences 2610 and 2620. The detector base station uses 20 MHz bandwidth, and the center frequency of the detector base station is the same as the center frequency of the aggressor base station. Thus, a detection region 2603a may be set in the upper band, a detection region 2603b may be set in the lower band, and the sequences 2610 and 2620 may be extracted. According to another embodiment, only one of the detection region 2603a and the detection region 2603b may be used.

Figure 26D:
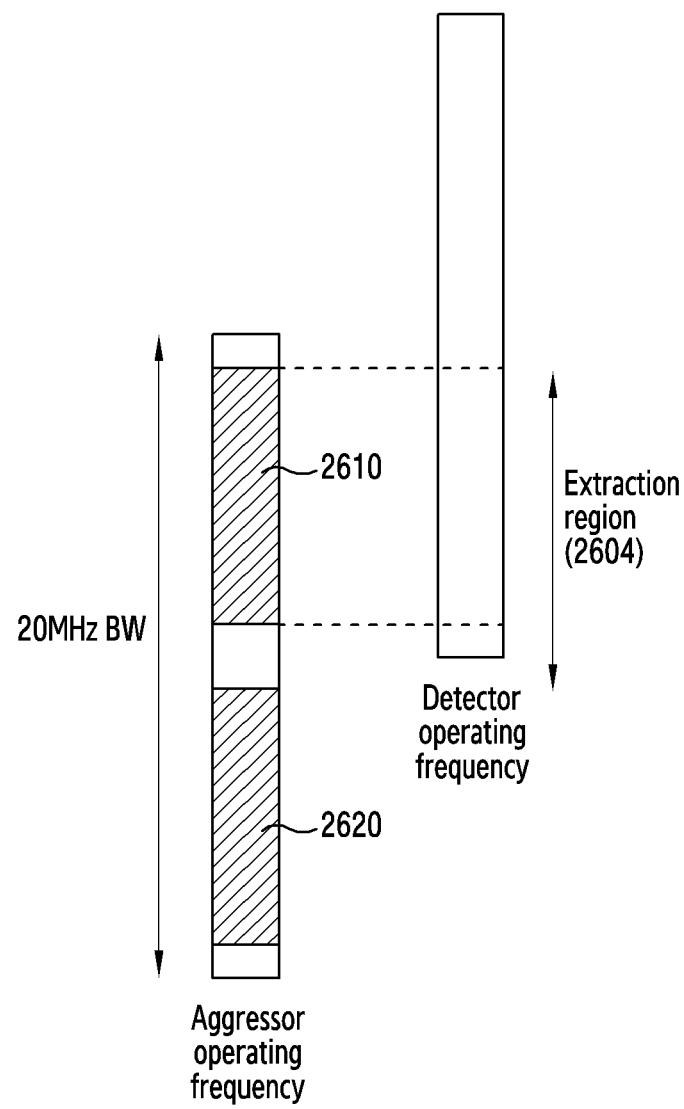

Referring to FIG. 26D, the aggressor base station uses 20 MHz bandwidth including two base bands having the 10 MHz bandwidth. Accordingly, the signal transmitted from the aggressor base station includes one each for band, that is, two sequences 2610 and 2620. The detector base station uses 20 MHz bandwidth, and the center frequency of the detector base station leans to the upper band of the aggressor base station. Hence, a detection region 2604 may be set in the lower band of the detector base station, and the sequence 2610 may be extracted.

Figure 26E:
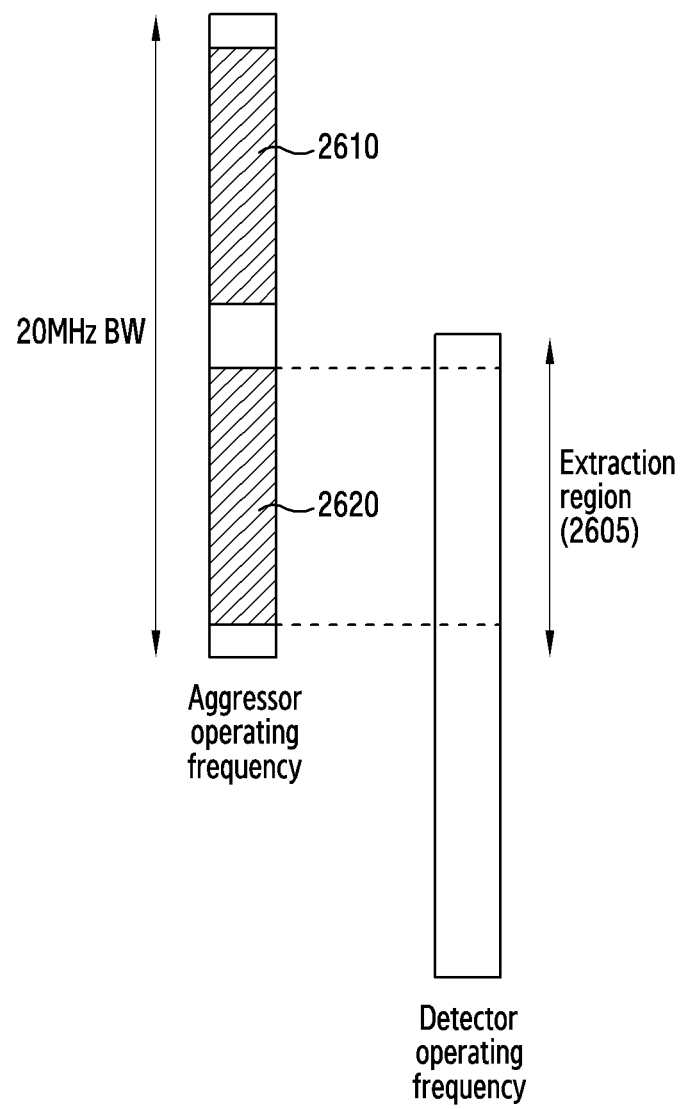

Referring to FIG. 26E, the aggressor base station uses 20 MHz bandwidth including two base bands having 10 MHz bandwidth. Hence, the signal transmitted from the aggressor base station includes one each for band, that is, two sequences 2610 and 2620. The detector base station uses 20 MHz bandwidth, and the center frequency of the detector base station leans to the lower band of the aggressor base station. Accordingly, a detection region 2605 may be set in the upper band of the detector base station, and the sequence 2620 may be extracted.

Figure 26F:
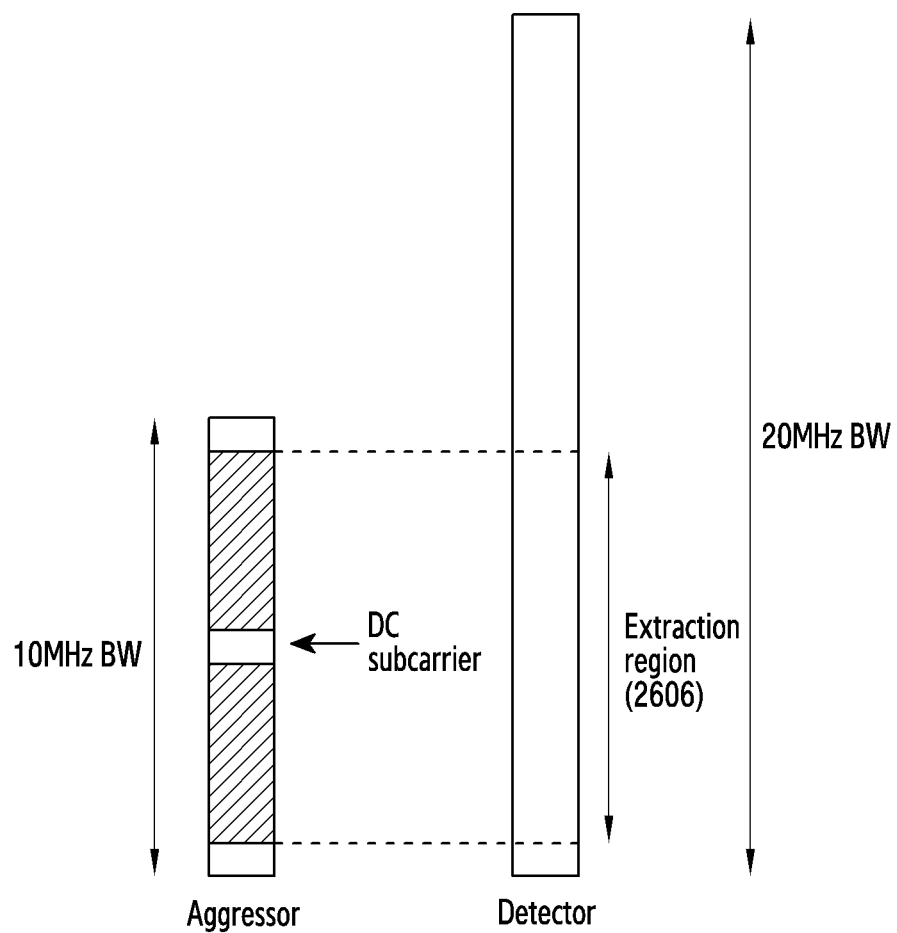

Referring to FIG. 26F, the aggressor base station uses 10 MHz bandwidth including one base band having 10 MHz bandwidth. Accordingly, the signal transmitted from the aggressor base station includes one sequence 2160. Herein, since a direct current (DC) subcarrier exists at the center of the sequence 2610, the signal is not mapped to the DC subcarrier. That is, the sequence 2610 is divided into two parts on the frequency axis, based on the DC subcarrier. The detector base station uses 20 MHz bandwidth including two base bands having 10 MHz bandwidth, and the lower band corresponds to the operating frequency of the aggressor base station. Hence, an extraction region 2606 is set in the lower band. In this case, the DC subcarrier of the aggressor base station is not the DC subcarrier of the detector base station. Thus, to obtain an accurate correlation operation result, the detector base station may extract the sequence 2610 in consideration of the position of the DC subcarrier of the aggressor base station. That is, the detector base station may extract the sequence 2610, excluding the subcarrier signal corresponding to the DC subcarrier of the aggressor base station in the extraction region 2606.

FIG. 26A and FIG. 26B, the detection region 2601 or 2602 includes the DC subcarrier of the detector base station. However, since the corresponding subcarrier is not the DC subcarrier in terms of the aggressor base station, the DC subcarrier of the detector base station may include a signal. Thus, if performing the operation of detecting the aggressor, according to an embodiment, the signal mapped to the DC subcarrier may not be excluded and may be included in the extraction result. Accordingly, the signal sequence including the signal extracted from the DC subcarrier is compared with the candidate sequence. According to another embodiment, considering the received signal damage in the DC subcarrier, the value of the DC subcarrier may be set to a predefined value (e.g., 0).

In the embodiments described with reference to FIG. 26A through FIG. 26F, it has been described that the sequence is transmitted on the band basis, and the number of the transmitted sequences differs depending on the total bandwidth. In the 5G NR system, since a bandwidth part (BWP) is used, the bandwidth may be understood as the bandwidth of the BWP in the explanations with reference to FIG. 26A through FIG. 26F. In this case, the number of the sequences to be arranged on the frequency axis may differ according to the bandwidth of the BWP configured in the aggressor base station. In addition, the bandwidth and the position of the BWP may be variously configured. Thus, the management device may provide the aggressor base station with information (e.g., a bandwidth, a position, an SCS, etc.) of the BWP enabled for the sequence transmission among the configured BWPs, and the detector base station may extract the sequence based on the BWP information of the aggressor base station.

In the embodiment described with reference to FIG. 25, the aggressor determining unit 2570 may identify a valid aggressor base station based on the analysis data. According to an embodiment, the aggressor determining unit 2570 may calculate a channel quality (e.g., signal to interference and noise ratio (SINR), a signal to noise ratio (SNR), etc.) per candidate sequence using channel power and noise power per candidate sequence included in the analysis data. If the aggressor base station repeatedly transmits the sequence during the transmission period, the detector base station may accumulate power values and noise values, and then calculate the channel quality. If the calculated channel quality value is greater than a threshold, the detector base station may determine that the corresponding sequence is detected. Herein, the threshold may be defined to satisfy an occurrence probability of a target false alarm. The threshold may be determined based on a simulation conducted under a specific channel environment.

According to an embodiment, a setting value for the aggressor detection may be changed with time, based on sequence transmission time information of the aggressor base station. If obtaining the sequence transmission time information of the aggressor base stations, the detector base station may perform only the detection on a specific candidate sequence at a specific time. Hence, wrong detection for a sequence not transmitted may be prevented. That is, the detector base station may not perform the aggressor detection operation on the sequence which is identified to be not transmitted at a corresponding time. Alternatively, the detector base station performs the aggressor detection operation on the sequence which is identified as not transmitting at the corresponding time, but may not reflect the corresponding detection operation result in determining the aggressor.

According to an embodiment, based on the sequence transmission period information of the aggressor base station group, the setting value for the aggressor detection may be changed over time. If obtaining the sequence transmission period information of the aggressor base station groups, the detector base station may not perform the aggressor detection operation on the aggressor base station belonging to the corresponding group in other period than the sequence transmission period of a specific group. The detector base station may perform the aggressor detection operation on the aggressor base station belonging to the corresponding group in the sequence transmission period of the specific group. Alternatively, the detector base station performs the detection on the aggressor base station group regardless of the sequence transmission period, but may selectively reflect the detection result according to the sequence transmission period in determining the aggressor. In addition, to exclude the sequence detected wrong in the aggressor determination, the detector base station may report only information of some aggressors having a greater interference level among aggressors determined in a specific period to other device (e.g., the management device).

The detector base station determining the aggressor as described above, may report the determination result to other device (e.g., the management device). Herein, the reported object may include information of all of the detected sequences/aggressors or information of some sequences/aggressors having the great interference level. The reported information may include at least one of detector base station information, the channel quality per sequence, sequence identification information, a time axis position (e.g., a symbol position) at which the sequence is detected, the reception delay time, a distance to the base station transmitting the detected sequence, and information of the base station transmitting the detected sequence. The detector base station information may include at least one of an evolved universal terrestrial radio access (EUTRA) absolute radio frequency channel number (EARFCN), a bandwidth, a center frequency, and a region/location.

Figure 27:
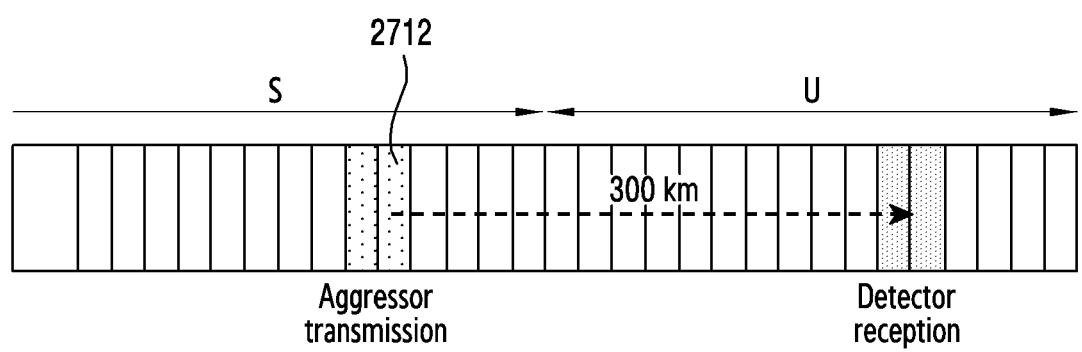
FIG. 27 illustrates an example of a sequence detection position according to a distance from an aggressor in a wireless communication system according to an embodiment of the present disclosure.

The distance to the base station transmitting the detected sequence in the reported information may be estimated based on the reception delay time of the sequence. FIG. 27 illustrates an example of a sequence detection position according to a distance from an aggressor in a wireless communication system according to an embodiment of the present disclosure. Referring to FIG. 27, a sequence 2712 is transmitted by an aggressor base station in a special subframe, and is received at a detector base station in a subsequent UL subframe. At this time, if the time duration of one subframe is 1 ms, the time delay as shown in FIG. 27 may be converted into about 300 km.

Figure 28:
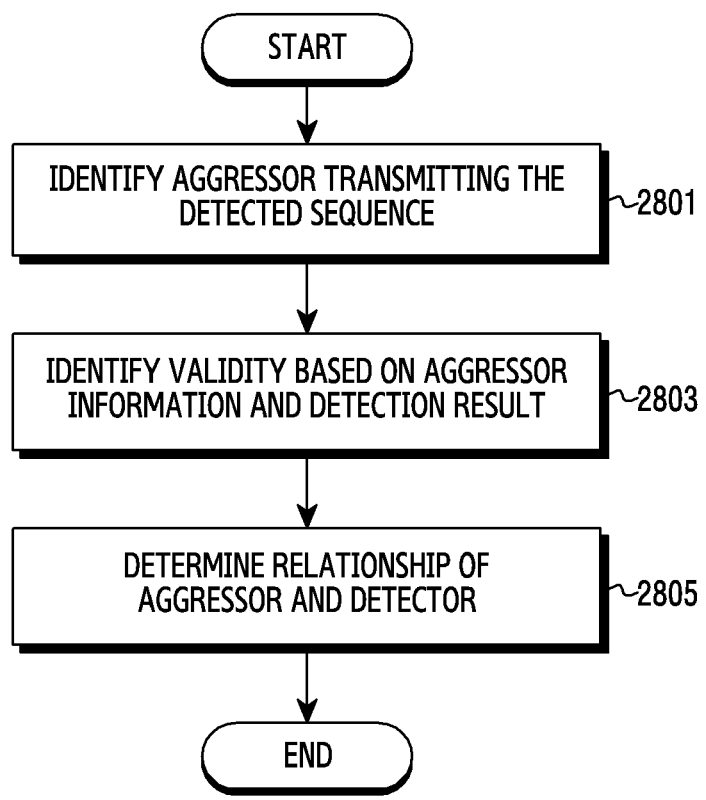
FIG. 28 is a flowchart for operations of a management device for determining an aggressor in a wireless communication system according to an embodiment of the present disclosure.

As described above, the measurement result generated by the detector base station may be reported to the management device. Hence, the management device may determine the aggressor, and take a necessary measure. Operations of the management device for the aggressor determination are shown in FIG. 28. FIG. 28 illustrates a flowchart for operations of a management device for determining an aggressor in a wireless communication system according to an embodiment of the present disclosure. FIG. 28 illustrates an operating method of the management device 130.

Referring to FIG. 28, in step 2801, the management device identifies an aggressor base station which transmits a detected sequence. The management device may identify the aggressor base station transmitting the detected sequence based on a sequence detection result reported from the detector base station, detector base station information, and sequence transmission scheduling result (e.g., sequence identification information and transmission times) of aggressor base stations. For example, if a sequence #1 is allocated to a base station #1, and detection of the sequence #1 is reported from a base station #2 is reported, the management device may determine that the signal of the base station #1 is detected by the base station #2, that is, the base station #1 is an aggressor to the base station #2.

In step 2803, the management device identifies validity based on the aggressor base station information and the detection result. Since a sequence detection error may occur in the detector base station, the management device may identify whether the determined aggressor is valid. For example, the management device may identify the validity based on operating frequencies (e.g., the EARFCN, the center frequency, the bandwidth) or locations of the detector base station and the aggressor base station. As another example, the management device may identify the validity based on at least one of presence or absence of interference reciprocity, a magnitude of the sequence measurement value, and the number of detections.

In step 2805, the management device determines a relationship of the aggressor and the detector. For example, the management device may generate information indicating the relationship of the aggressor and the detector. The information indicating the relationship of the aggressor and the detector may include one-to-one, many-to-one, and many-to-many aggressor-victim mapping information. Herein, many may be a cluster determined based on geolocation information. The relationship of the aggressor and the detector may be used for a management plan for subsequent interference measurements. For example, the management device may adjust statistics information (e.g., information per season/month/week/day/time/location) of the aggressor/victim and operation time zone/period/frequency of the aggressor identification operations in a long-term period. For example, the management device may increase the frequency of performing the interference measurement operation in a time zone or a place having considerable interference.

As described with reference to FIG. 28, the management device may identify the validity of the identified aggressor. A specific example of the validity identification is as follows.

Figure 29A:
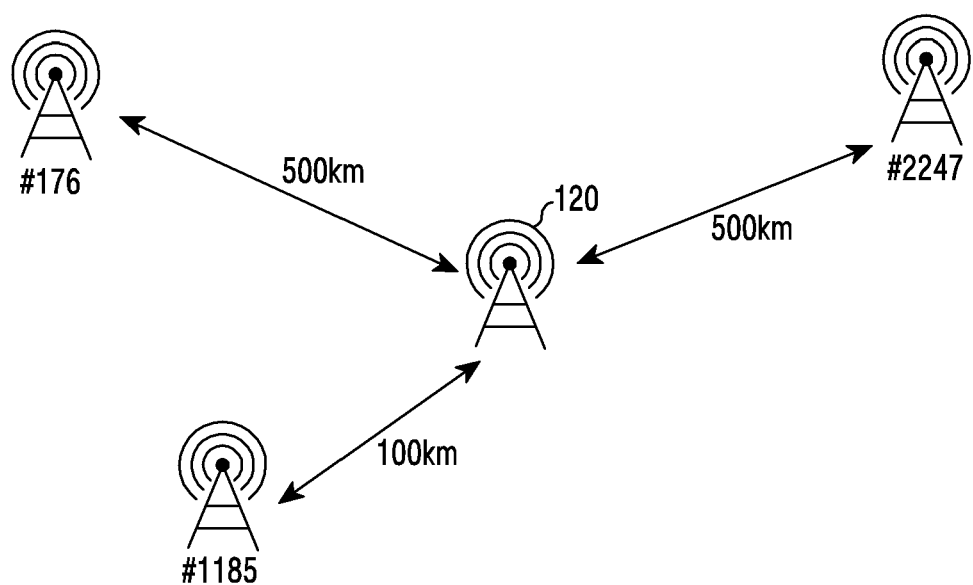
FIG. 29A and FIG. 29B illustrate an example of deployment and operating frequencies of base stations in a wireless communication system according to an embodiment of the present disclosure.
Figure 29B:
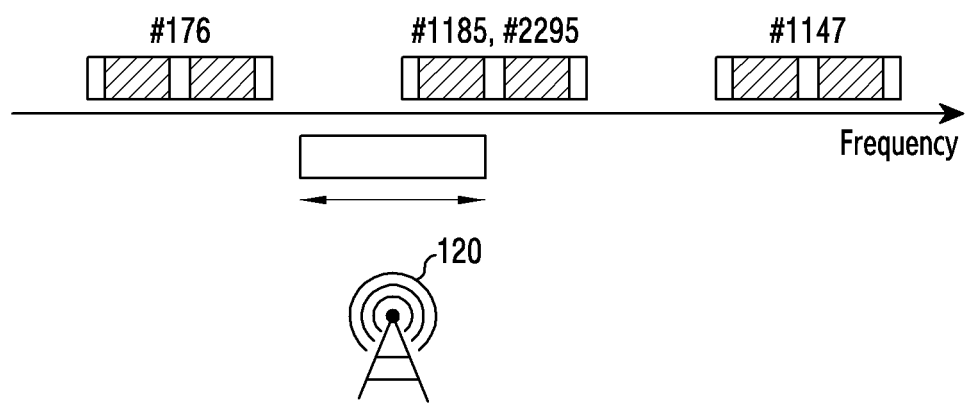

According to an embodiment, the validity may be identified using the operating frequency of the base station. An embodiment of the validity identification using the operating frequency is described below with reference to FIG. 29A and FIG. 29B. FIG. 29A and FIG. 29B illustrate an example of deployment and operating frequencies of base stations in a wireless communication system according to an embodiment of the present disclosure. FIG. 29A illustrates the deployment of the base stations, and FIG. 29B illustrates the operating frequencies.

Referring to FIG. 29A, based on a base station 120, a base station #176 may be located at a distance of 500 km, a base station #2247 may be located at a distance of 500 km, and a base station #1185 may be located at a distance of 100 km. Referring to FIG. 29B, the operating frequency of the base station 120 partially overlaps the operating frequencies of the base station #1185 and a base station #2295, and does not overlap the operating frequencies of the base station #176 and a base station #1147.

Sequence transmissions for the aggressor base stations may be scheduled as shown in <Table 1> below.

TABLE 1

| Transmission time | Time1 | Time2 | ... |
|---|---|---|---|
| Sequence#1 | #178 | #588 | ... |
| Sequence #2 | #25 | #165 | ... |
| Sequence #3 | #295 | #730 | ... |
| Sequence #4 | #214 | #146 | ... |
| Sequence #5 | #316 | #33 | ... |
| Sequence #6 | #133 | #408 | ... |
| Sequence #7 | #420 | #396 | ... |
| Sequence #8 | #176 | #89 | ... |

Referring to <Table 1>, the base station #176 is scheduled to transmit the sequence #8 at the time 1. In this case, for example, if the base station 120 reports that the sequence #8 is detected during the time 1, the management device may estimate that the base station 120 receives the signal transmitted by the base station #176. However, as shown in FIG. 29B, since the operating frequency of the base station 120 does not overlap the operating frequency of the base station

176, the report that the base station 120 detects the sequence #8 during the time 1 is based on the wrong detection. As another example, if the base station 120 reports that the sequence #8 is detected with a time delay corresponding to about 100 km, the management device may estimate that the distance between the base station 120 and the base station #176 is 100 km. However, as shown in FIG. 29A, since the distance between the base station 120 and the base station #176 is 500 km, the report that the base station 120 detects the sequence #8 is based on the wrong detection.

Sequence transmissions for the aggressor base stations may be scheduled as shown in <Table 2>.

TABLE 2

| Transmission time | Time1 | Time2 | ... |
|---|---|---|---|
| Sequence #1 | #858 | #1961 | ... |
|  | #2239 | #484 |  |
|  | #1395 | #1513 |  |
| Sequence #2 | #1203 | #1694 | ... |
|  | #1411 | #1398 |  |
|  | #2237 | #119 |  |
| Sequence #3 | #553 | #1220 | ... |
|  | #1546 | #160 |  |
|  | #2250 | #1287 |  |
| Sequence #4 | #2234 | #1507 | ... |
|  | #1869 | #2152 |  |
|  | #701 | #21 |  |
| Sequence #5 | #1647 | #2176 | ... |
|  | #1762 | #889 |  |
|  | #2362 | #950 |  |
| Sequence #6 | #154 | #412 | ... |
|  | #2161 | #760 |  |
|  | #1587 | #389 |  |
| Sequence #7 | #109 | #2371 | ... |
|  | #191 | #1697 |  |
|  | #369 | #1709 |  |
| Sequence #8 | #1185 | #2282 | ... |
|  | #2295 | #409 |  |
|  | #1147 | #1217 |  |

Referring to <Table 2>, the base station #1185, the base station #2295, and the base station #1147 are scheduled to transmit the sequence #8 at the time 1. In this case, for example, if the base station 120 reports that the sequence #8 is detected during the time 1, the management device may estimate that the base station 120 receives the signal transmitted by at least one of the base station #1185, the base station #2295, and the base station #1147 received. At this time, considering the relationship of the operating frequencies as shown in FIG. 29B, the base station 120 may not receive the signal of the base station #1147 and may receive the signals of the base station #1185 and the base station #2295, and thus the aggressor transmitting the detected sequence #8 is identified as one of the base station #1185 and the base station #2295. In addition, if the base station 120 reports that the distance corresponding to the detected time delay of the sequence #8 is 100 km, the management device may determine that the aggressor transmitting the detected sequence #8 is the base station #1185, according to the deployment as shown in FIG. 29B.

According to an embodiment, the validity may be identified using the magnitude of the measured value for the sequence. For example, if a metric value included in the sequence detection result is greater than a predefined threshold, it may be determined that the detection result is valid. The sequence detection result may include a difference value between a peak value of the detected sequence and an average noise power. In this case, if the difference value is greater than the threshold, the management device may determine that the sequence detection result is valid. As another example, the management device may convert the difference value into the channel quality (e.g., SNR) value by post-processing the difference value, and compare the channel quality value with the threshold. If the channel quality value is greater than the threshold, the management device may determine that the sequence detection result is valid.

According to an embodiment, the validity may be identified based on the number of detection reports with respect to the same sequence. If identifying that a value (e.g., a sequence index or a transmission timing) indicating the detected sequence included in the sequence detection result is equal to or greater than a threshold number of times, the management device may determine that the sequence detection is valid. For example, the management device receives and stores N-ary (e.g., eight) sequence detection result reports from each victim base station. Next, if a specific sequence is repeatedly identified over M times (e.g., four times) in the N-ary reports, the management device may determine that the detection of the corresponding sequence is valid. That is, the management device may select information repeated over M times among the N-ary reports, and determine the selected information as the valid sequence detection result.

According to an embodiment, the validity may be identified using the interference reciprocity between the aggressor base station and the victim base station. For example, if identifying the interference reciprocity between the aggressor base station and the victim base station, the management device may determine that the corresponding sequence detection result is valid. Herein, the reciprocity is recognized if a first base station determines a second base station as an aggressor cell and the second base station determines the first base station as an aggressor cell. For example, the management device may estimate the second base station as the aggressor based on the sequence detection report received from the first base station, and then estimate at least one aggressor based on the sequence detection report received from the second base station. At this time, if the first base station is included in the at least one aggressor estimated by the sequence detection report received from the second base station, the management device may determine that the sequence detection report received from the first base station and the sequence detection report received from the second base station are valid.

At least one of the above-described various validation methods may be applied to identify the validity. In other words, to determine the validity of the detection, any one of the operating frequency, the magnitude of the measurement value, the number of the detection reports, and the interference reciprocity may be used independently, or two or more may be used jointly.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. In addition, a plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Thus, the scope of the present disclosure is not limited and defined by the described embodiment and is defined not only the scope of the claims as below but also their equivalents.

The invention claimed is:

1. A method performed by a base station in a wireless communication system, the method comprising:
    identifying a resource for transmitting at least one sequence for interference measurement of another base station, based on information received from a management device; and
    transmitting the at least one sequence through the resource,
    wherein the information received from the management device comprises information of the at least one sequence and the resource, and
    wherein the information of the at least one sequence and the resource is generated based on a grouping result of base stations based on an operating frequency.

2. The method of claim 1,
    wherein the at least one sequence is mapped to at least one second symbol preceding at least one first symbol for switching between downlink communication and uplink communication in a subframe, and
    wherein the at least one second symbol comprises all or part of symbols for the downlink communication in the subframe.

3. The method of claim 1,
    wherein the at least one sequence is mapped to at least one second symbol preceding at least one first symbol for switching between downlink communication and uplink communication in a subframe, and
    wherein an interval between the at least one first symbol and the at least one second symbol is determined according to a distance range of an aggressor to be detected.

4. The method of claim 1, wherein the at least one sequence is independently mapped to a resource per unit band, if the base station uses a bandwidth comprising a plurality of unit bands.

5. The method of claim 1,
    wherein the at least one sequence is mapped to at least two symbols,
    wherein a signal mapped to a first symbol of the two symbols is generated by adding a rear portion designated in a first portion of the at least one sequence mapped to the first symbol to a front end, and
    wherein a signal mapped to a second symbol of the two symbols is generated by adding a front portion designated in a second portion of the at least one sequence mapped to the second symbol to a rear end.

6. The method of claim 1, further comprising:
    changing a configuration of a special subframe, based on other information received from the management device after transmitting the at least one sequence.

7. A method performed by a base station in a wireless communication system, the method comprising:
    identifying a resource to monitor at least one sequence transmitted by another base station, based on information received from a management device;
    detecting the at least one sequence from the resource; and
    transmitting detection result information of the at least one sequence to the management device,
    wherein the information received from the management device comprises information of the at least one sequence and the resource, and
    wherein the information of the at least one sequence and the resource is generated based on a grouping result of base stations based on an operating frequency.

8. The method of claim 7,
    wherein the resource comprises at least one first symbol for switching between downlink communication and uplink communication in a subframe, and/or at least one second symbol for uplink communication following the at least one first symbol, and
    wherein a number of the at least one second symbols is determined according to a distance range of an aggressor to be detected.

9. The method of claim 7, wherein detecting the at least one sequence comprises:
    compensating for a frequency offset different from a frequency shift value applied to an uplink signal, with respect to a signal received through the resource.

10. The method of claim 7, wherein detecting the at least one sequence comprises:
    compensating for a frequency offset corresponding to a center frequency difference between the base station and the another base station, with respect to a signal received through the resource.

11. The method of claim 7, wherein detecting the at least one sequence comprises:
    comparing a signal sequence comprising a signal extracted from a direct current (DC) subcarrier of the signal received through the resource with a candidate sequence.

12. The method of claim 7, further comprising:
    offloading a serving user terminal to another base station, based on other information received from the management device after transmitting the detection result information of the at least one sequence to the management device.

13. A base station in a wireless communication system, the base station comprising:

a transceiver; and at least one processor connected with the transceiver, wherein the at least one processor is configured to:
- based on information received from a management device, identify a resource for transmitting at least one sequence for interference measurement of another base station, and
- transmit the at least one sequence through the resource, wherein the information received from the management device comprises information of the at least one sequence and the resource, and wherein the information of the at least one sequence and the resource is generated based on a grouping result of base stations based on an operating frequency.

14. The base station of claim 13, wherein the at least one sequence is mapped to at least one second symbol preceding at least one first symbol for switching between downlink communication and uplink communication in a subframe, and wherein the at least one second symbol comprises all or part of symbols for the downlink communication in the subframe.

15. The base station of claim 13, wherein the at least one sequence is mapped to at least one second symbol preceding at least one first symbol for switching between downlink communication and uplink communication in a subframe, and wherein an interval between the at least one first symbol and the at least one second symbol is determined according to a distance range of an aggressor to be detected.

16. The base station of claim 13, wherein the at least one sequence is independently mapped to a resource per unit band, if the base station uses a bandwidth comprising a plurality of unit bands.

17. The base station of claim 13, wherein the at least one sequence is mapped to at least two symbols, wherein a signal mapped to a first symbol of the two symbols is generated by adding a rear portion designated in a first portion of the at least one sequence mapped to the first symbol to a front end, and wherein a signal mapped to a second symbol of the two symbols is generated by adding a front portion designated in a second portion of the at least one sequence mapped to the second symbol to a rear end.

18. The base station of claim 13, wherein the at least one processor is further configured to:
- change a configuration of a special subframe, based on other information received from the management device after transmitting the at least one sequence.

* * * * *